United States Patent [19]
Reed

[11] Patent Number: 5,803,128
[45] Date of Patent: Sep. 8, 1998

[54] BRAIDED CONDUIT AND METHOD OF MAKING A BRAIDED CONDUIT

[75] Inventor: Edward A. Reed, Waco, Tex.

[73] Assignee: Packless Metal Hose, Inc., Waco, Tex.

[21] Appl. No.: 533,431

[22] Filed: Sep. 25, 1995

Related U.S. Application Data

[63] Continuation-in-part of Ser. No. 236,217, Apr. 28, 1994.

[51] Int. Cl.$^6$ .................................................... F16L 33/26
[52] U.S. Cl. ........................ 138/123; 138/118; 138/109; 138/121; 72/367
[58] Field of Search .................................. 138/118, 109, 138/123, 121, 114; 72/367; 285/149

[56] References Cited

U.S. PATENT DOCUMENTS

| | | | |
|---|---|---|---|
| 770,599 | 9/1904 | Monteagle | 138/38 |
| 2,337,490 | 12/1943 | Penner | 72/370 |
| 2,365,688 | 12/1944 | Dewey | 76/107.1 |
| 2,667,650 | 2/1954 | Friedman | 72/377 X |
| 2,722,437 | 11/1955 | Phillips | 285/222.5 |
| 2,733,503 | 2/1956 | Beringer et al. | 72/333 |
| 3,004,330 | 10/1961 | Wilkins | 138/115 X |
| 3,292,414 | 12/1966 | Goeke | 72/367 X |
| 3,468,371 | 9/1969 | Menze | 165/156 |
| 3,863,526 | 2/1975 | Sygnator | 72/377 X |
| 4,031,745 | 6/1977 | McCarty | 72/367 |
| 4,377,083 | 3/1983 | Shepherd | 72/367 X |
| 4,514,997 | 5/1985 | Zifferer | 72/367 X |
| 4,523,637 | 6/1985 | Abramo | 165/104.34 |
| 4,672,834 | 6/1987 | Alberto | 72/325 |
| 4,693,323 | 9/1987 | Owensby | 174/68.3 X |
| 4,993,483 | 2/1991 | Harris | 165/45 |

FOREIGN PATENT DOCUMENTS

| | | |
|---|---|---|
| 731354 | 4/1966 | Canada . |
| 144460 | 6/1985 | European Pat. Off. . |
| 160498 | 11/1985 | European Pat. Off. . |
| 0202481 | 11/1986 | European Pat. Off. . |
| 0332853 | 9/1989 | European Pat. Off. . |
| 203759 | of 1900 | Germany . |
| 1 158 778 | 12/1963 | Germany . |
| 1223636 | 8/1966 | Germany . |
| 38 08 383 A1 | 9/1989 | Germany . |
| 57-49795 | 3/1982 | Japan . |
| 15510 | 6/1914 | United Kingdom . |
| 95/30107 | 11/1995 | WIPO . |

OTHER PUBLICATIONS

International Search Report for International application No. PCT/US95/02600 dated Jul. 13, 1995.
English translation of EP Patent Application 0,332,853 (Sep. 20, 1989).
English translation of EP Patent Application 0/202/481 (Nov. 26, 1986).
Titeflex Industrial Products Group, "Titeflex Metal Hose and Fittings", Catalog 777A.
Article Entitled "It Keeps Growing and Growing . . . " by Jim Wilder, Undercar Digest, vol. 19 No. 8, Mar. 1995, pp. 12–15.
Two (2) photographs of Midas Muffler Flexible Connector Exhaust Pipe, together with Midas Muffler Receipt for such pipe dated Mar. 22, 1995.
Section Drawing of Midas Muffler Flexible Connector Exhaust Pipe.
Maxwell Laboratories, Inc., "Magneform — Metal Forming with Magnetic Force", Product Bulletin MLB–2044A.
Packless Industries, "Packless Vibration Absorbers", Bulletin VA–1 (Mar. 1989).
Flexonics Inc., "Flexible Metal Hose and Fittings", Engineering Guide No. 350.
Maxwell Laboratories, Inc., "Magneform 7000 Series", Bulletin 1202A (1978).
Maxwell Laboratories, Inc., "Maxwell", Bulletin 1201R (1976).

*Primary Examiner*—Patrick F. Brinson
*Attorney, Agent, or Firm*—Conley, Rose & Tayon, P.C.

[57] ABSTRACT

Convoluted conduit covered with braid made by cold forming the braid to an end conduit or an end section of the convoluted conduit. Cold forming can involve magneforming. Resulting conduit need not be brazed, welded, or annealed, thereby facilitating construction of convoluted conduits with higher working pressures and/or less braid material.

67 Claims, 17 Drawing Sheets

BRAIDED CONDUIT AND METHOD OF MAKING A BRAIDED CONDUIT

RELATED APPLICATION

This application is a continuation-in-part of U.S. patent application 08/236,217 filed Apr. 28, 1994.

BACKGROUND OF THE INVENTION

1. Field of the Invention

This invention relates to braided conduit and methods of making braided conduits. In particular, this invention may be used in connection with convoluted conduits. Such convoluted conduits may be adapted to serve in flexible conduit applications.

2. Brief Description of the Related Art

Convoluted conduits such as metal hoses or ducts have been used for a number of years. These conduits are particularly useful in applications whereby a need may arise for the conduit to be moveable or flexible. For instance, these applications may involve conduits used where significant vibration may occur (in which case a convoluted conduit may be used as a vibration absorber), or in applications wherein the flexibility of the conduit is useful to move conduits and connections without fully disconnecting these conduits or connections. In some applications flexibility of the conduit is useful when it is desirable to install a conduit in a curved space (e.g., around another piece of equipment).

In one application convoluted conduits may be used for the suction and discharge lines of air conditioning and refrigeration systems to dampen the transmission of compressor-induced vibration through system piping. In another application, convoluted conduits may be used as exhaust piping for vehicles such as cars, trucks, boats, and the like.

Flexible conduits may have cross-sections that may be circular, square, rectangular, oval, or other shapes, whether regular or irregular. These flexible conduits may include, for example, convoluted (i.e., grooved, interlocked, spiral or corrugated) copper, brass, bronze, steel, aluminum, and stainless steel conduits. Other flexible conduit may be made of rubber or plastic materials that may or may not be convoluted.

One problem with flexible conduits is that pressure tolerances may reduce as flexibility is increased. For instance, in corrugated metal hoses, the flexibility is somewhat proportional to the number and size of the corrugations. However when appreciable internal pressure is applied to convoluted or corrugated metal hose, the hose will tend to elongate unless restrained. Generally this restraint is provided by a braid sheath or covering over the conduit. This braid may be made of, for example, copper, bronze, steel, stainless steel, aluminum, or other alloys and materials. The braid may include a multitude of fibers or wires interlocked in various ways (such as criss-cross patterns, cross-hatch patterns, etc.) to increase their strength. An example of a flexible conduit covered with a braid is shown in FIG. 10. The flexible conduit in FIG. 10 includes reinforcing ferrules at each end, a wire braid woven in a criss-cross pattern, tube ends, and corrugated flexible tubing. The braid also provides protection to the conduit.

Typically braids are attached to flexible conduits by welding or brazing techniques (see braze joint in FIG. 10). In the embodiment shown in FIG. 10 the flexible tubing, tube end, braid, and ferrule are all brazed together at the braze joint. These techniques, however, tend to have the significant disadvantage that they cause certain portions of the material of the braid or the conduit, or both, to become annealed or weakened when relatively high temperatures are applied. As a result, the tensile strength of the braid materials may be significantly reduced, which in turn reduces the working pressures to which the conduit may be subjected. In these embodiments the braid tends to fail at or near the braze point.

European Application No. 202,481 to Marti et al and European Application No. 332,853 to Schuttler et al. teach other methods of preparing covered conduits.

SUMMARY OF THE INVENTION

In a general aspect an embodiment of the invention is directed to a method of covering a convoluted conduit with a braid, the convoluted conduit having convolutions, a substantially unconvoluted end section, and a convolution proximate the end section. The method may include:

assembling the convoluted conduit and an end conduit such that an inner surface of the end conduit substantially surrounds an outer surface of the end section of the convoluted conduit;

assembling the braid, the convoluted conduit, the end conduit, and a portion of additional material such that (a) a portion of the braid substantially surrounds an outer surface of the end conduit, (b) a portion of the braid is between the end conduit and the additional material, and (c) a portion of the braid is between the convolution proximate the end section and the additional material; and cold forming the assembled braid and additional material such that (a) at least a portion of the additional material is bent onto a portion of the braid, (b) a portion of the braid is held by friction between an outer surface of the end conduit and at least a portion of the additional material, (c) a portion of the braid is held by friction between an outer surface of the convolution proximate the end section and at least a portion of the additional material, and (d) the convolutions of the convoluted conduit are not substantially deformed.

Alternately, the method may include:

assembling the convoluted conduit and an end conduit such that an inner surface of the end section substantially surrounds an outer surface of the end conduit;

assembling the braid, the convoluted conduit, the end conduit, and a portion of additional material such that (a) a portion of the braid substantially surrounds an outer surface of the end section, (b) a portion of the braid is between the end section and the additional material, and (c) a portion of the braid is between the convolution proximate the end section and the additional material; and cold forming the assembled braid and additional material such that (a) at least a portion of the additional material is bent onto a portion of the braid, (b) a portion of the braid is held by friction between an outer surface of the end section and at least a portion of the additional material, (c) a portion of the braid is held by friction between an outer surface of the convolution proximate the end section and at least a portion of the additional material, and (d) the convolutions of the convoluted conduit are not substantially deformed.

Preferably the cold forming is by magneforming and preferably it thickens the additional material as it compresses the additional material.

An embodiment of the invention is also directed to a conduit made by the methods described herein, and a conduit covered with a braid which includes:

a section of convoluted conduit comprising convolutions, a substantially unconvoluted end section, and a convolution proximate the end section;

an end conduit substantially surrounding at least a portion of an outer surface of the end section;

a braid covering at least a portion of the convoluted conduit and at least a portion of the end conduit;

additional material covering a portion of the braid; and wherein at least a portion of additional material is cold formed onto a portion of the braid such that (a) a portion of the braid is held by friction between an outer surface of the end conduit and at least a portion of the additional material, (b) a portion of the braid is held by friction between an outer surface of a convolution proximate the end section and at least a portion of the additional material, and (c) the convolutions of the convoluted conduit are not substantially deformed.

Alternately, the covered conduit may include:

a section of convoluted conduit comprising convolutions, a substantially unconvoluted end section, and a convolution proximate the end section, and wherein the end section substantially surrounds an outer surface of an end conduit;

a braid covering at least a portion of the convoluted conduit and at least a portion of the end section;

additional material covering a portion of the braid; and wherein at least a portion of additional material is cold formed onto a portion of the braid such that (a) a portion of the braid is held by friction between an outer surface of the end section and at least a portion of the additional material, (b) a portion of the braid is held by friction between an outer surface of a convolution proximate the end section and at least a portion of the additional material, and (c) the convolutions of the convoluted conduit are not substantially deformed.

Magneforming is preferably used to make the covered convoluted conduit. The convoluted conduit may preferably be bent to include a raised ridge, and the braid may be bent around the ridge. Preferably the braid is bent, thereby strengthening the frictional hold on the braid. More preferably, the conduit includes an outer diameter greater than an outer diameter of the end section or end conduit, the braid lies against both the outer diameter of the conduit and the outer diameter of the end section or end conduit, and the braid is bent so that it substantially conforms to the shape of an interface region between the conduit and the end section or end conduit. Preferably the braid includes flattened strips of material (preferably flattened metal).

The covered conduit may be connected to pumps and compressors, and may act as a vibration absorber. It may also be used in exhaust systems of vehicles.

DETAILED DESCRIPTION OF THE PREFERRED EMBODIMENTS

Figure 1:
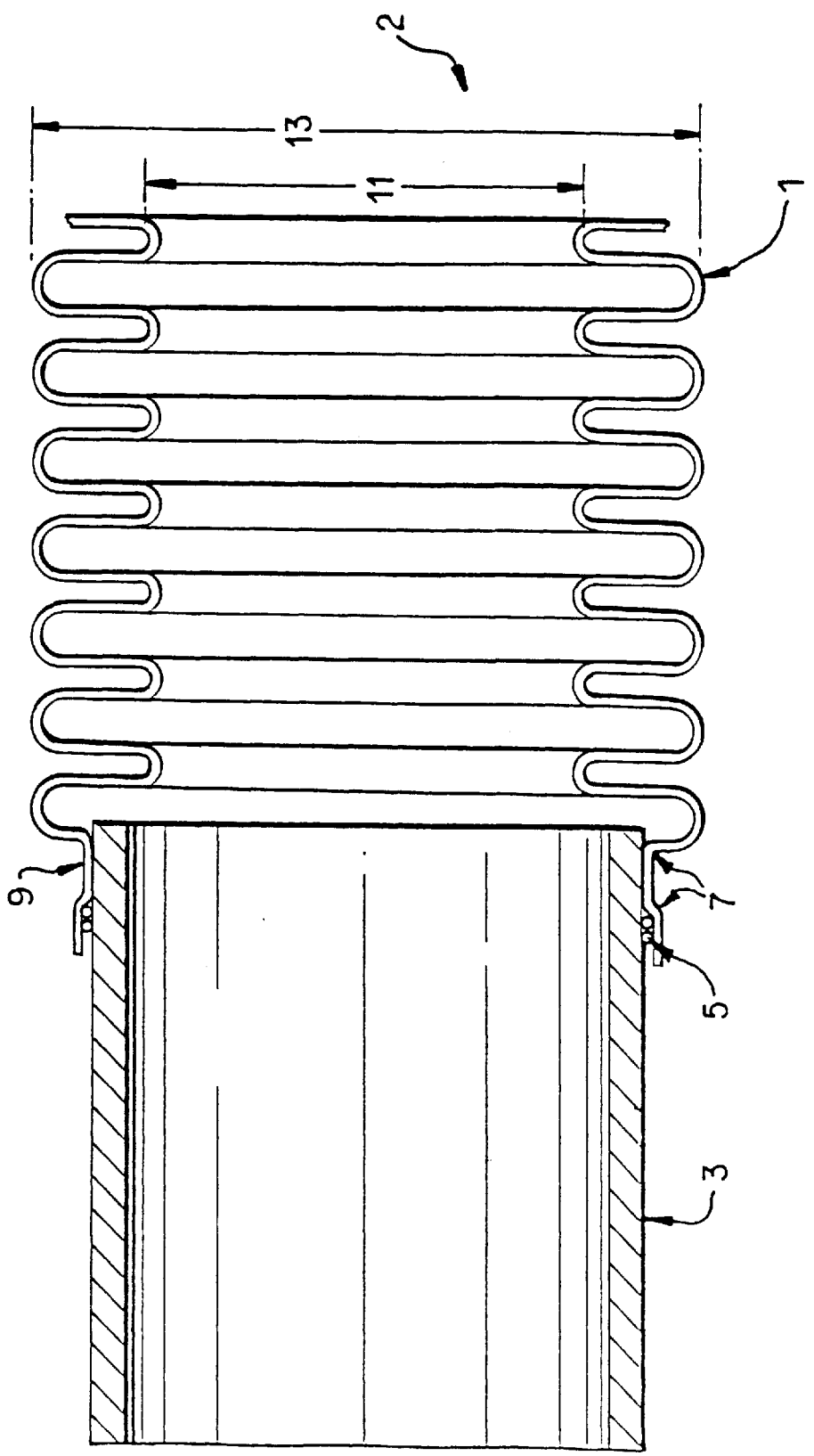
FIG. 1 depicts a section of convoluted conduit assembled with a conduit end and fill material (Scale 2:1).

FIG. 1 is a lengthwise cross-section of a section of convoluted conduit 1, an end conduit 3, and fill material 5. In FIG. 1, the section of convoluted conduit 1 is corrugated metal with outside diameter varying from outside diameter 11 to outside diameter 13. End conduit 3 may be a tube or fitting. Fill material 5 is preferably solder ring (i.e., solder wire) that has been wrapped around end conduit 3. In FIG. 1 the solder wire has been wrapped around end conduit 3 three times.

As shown in FIG. 1, in a preferred embodiment a section of convoluted conduit 1 may be placed onto a section of end conduit 3 with fill material 5 placed between the section of convoluted conduit 1 and the end conduit 3. The section of convoluted conduit 1 is preferably bent such that at least one bend 7 in this conduit 1 allows the portion 9 of the section of convoluted conduit 1 to be placed substantially adjacent to the end conduit 3 and the fill material 5.

Preferably the section of convoluted conduit 1 is cold formed. As such, in some embodiments bend 7 may be optional since the cold forming may serve to bend the section of convoluted conduit 1 to form portion 9, bend 7, and to bend the section of convoluted conduit 1 onto the fill material 5.

Figure 2:
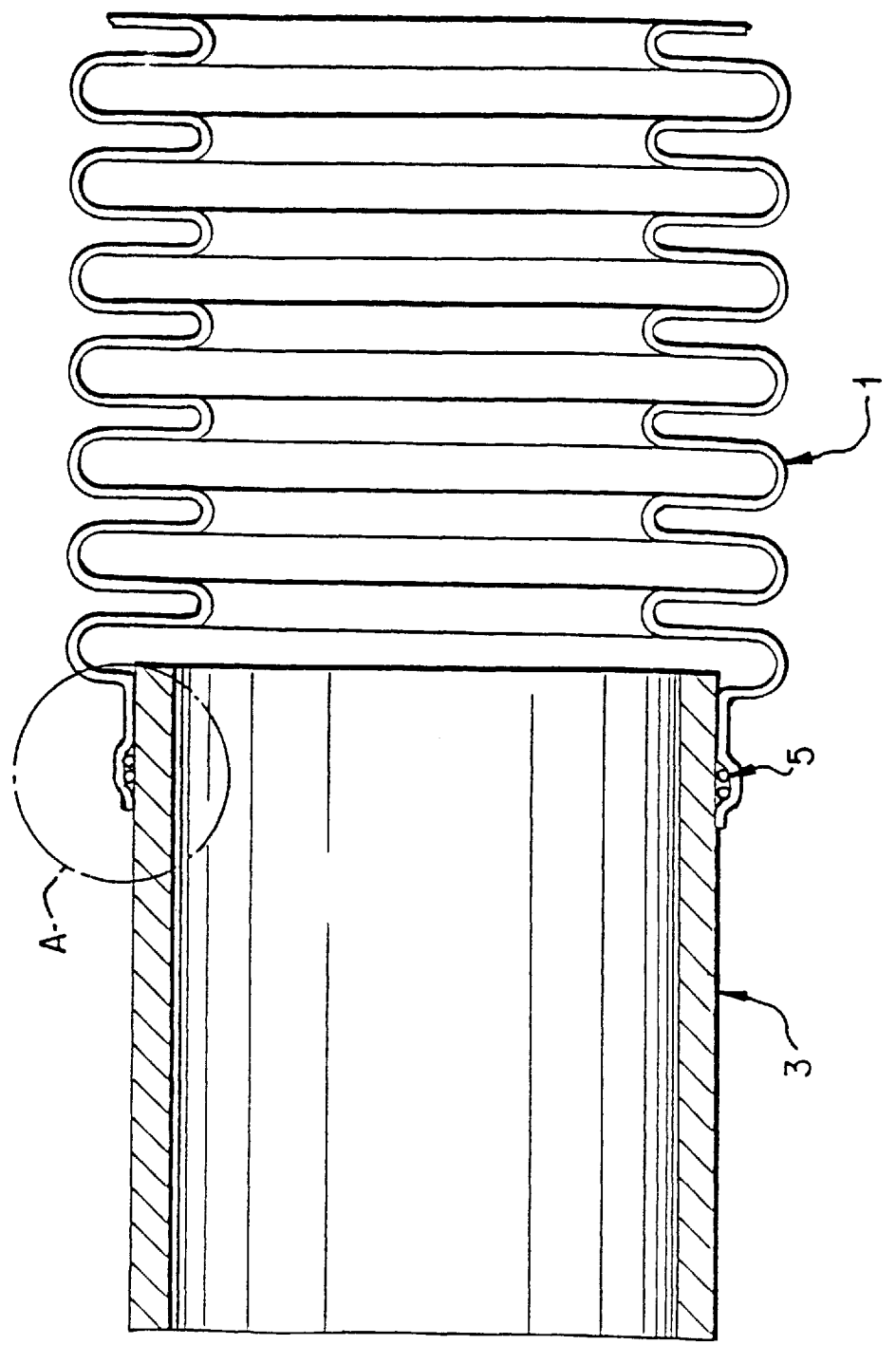
FIG. 2 depicts the assembly of FIG. 1 after it has been cold formed (Scale 2:1).

Once the assembly shown in FIG. 1 has been prepared, it may then be cold formed such that the section of convoluted conduit 1 is compressed onto a part of the end conduit 3 and held by friction with the end conduit 3. The fill material 5 is also preferably held by friction (e.g., trapped or encapsulated) between the section of conduit 1 and the end conduit 5. FIG. 2 shows the assembly in FIG. 1 after it has been cold formed.

In this application the term "cold forming" means bending materials without application of substantial additional heat. For instance, in a preferred embodiment the materials are made of metal which may be heated in order to bend it. In the context of this application, however, the metals are cold formed by magneforming, roll forming, hydraulic forming, tooling (e.g. by hand or by machine), or any other bending process which doesn't apply substantial additional heat to the materials to be bent. Of course, cold forming often results in heat as a byproduct of bending, etc., however such byproduct heat is not to be considered "substantial additional heat" for the purposes of this application.

Figure 3:
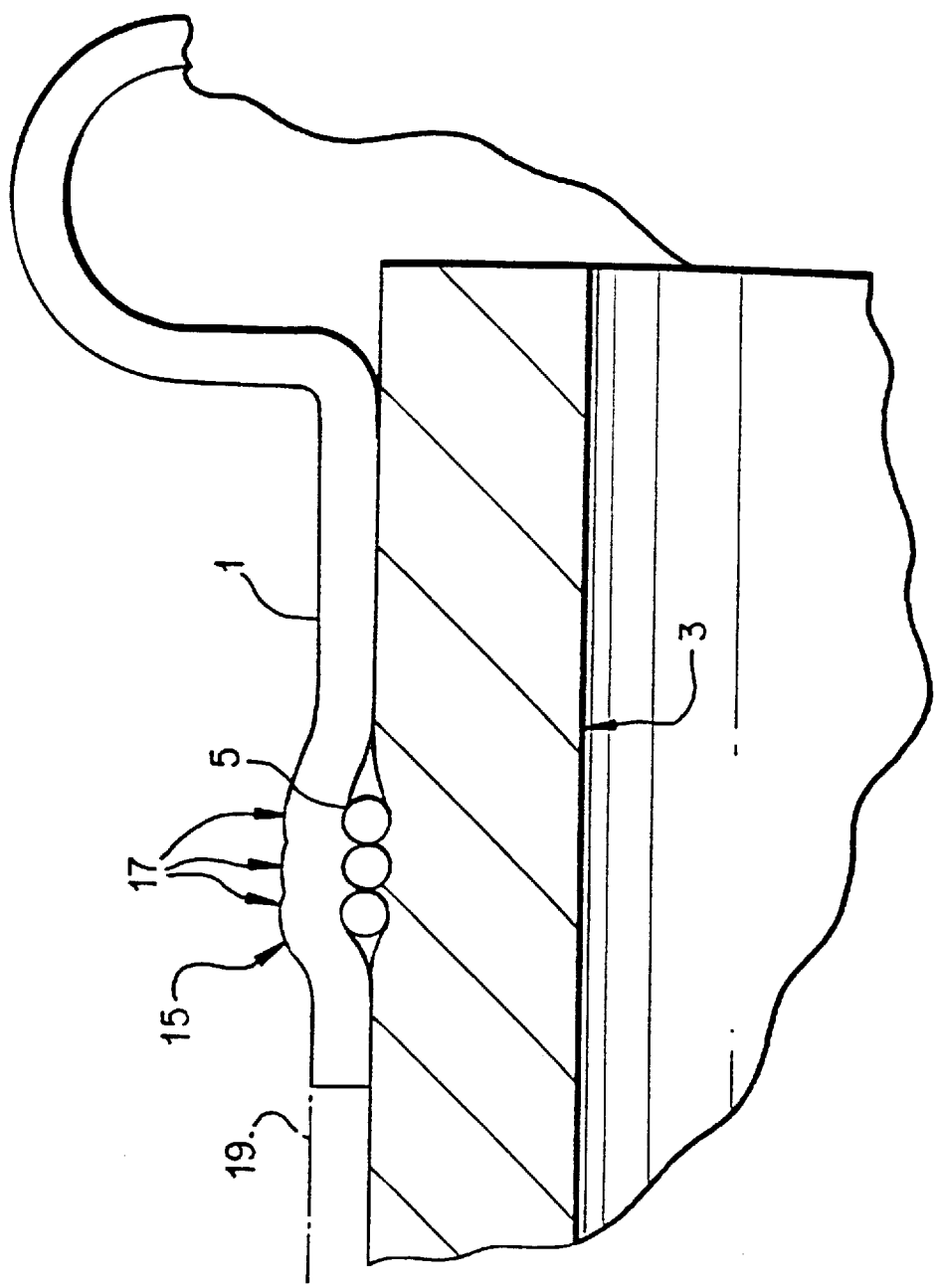
FIG. 3 depicts an expanded view of section "A" in FIG. 2 (Scale 8:1).

Encircled Section A in FIG. 2 is expanded to show "View A" in FIG. 3. As shown in FIG. 3, the section of convoluted conduit 1 is, in a preferred embodiment, compressed onto both the end conduit 3 and the fill material 5. Preferably the fill material 5 is less deformable than the material of the section of convoluted conduit 1. In this manner, at least one ridge 15 is formed. Minor ridges, such as the three minor ridges 17 in FIG. 3, may also be formed. These ridges 15 and 17 may be termed "raised ridges" because they extend above the plane 19 formed by the outer surface of the section of convoluted conduit 1.

Magneforming has been found to be particularly suited to cold forming materials as described in this application. Magneforming is a production method of forming parts and assemblies utilizing energy generated in a pulse magnetic field. In a general sense, controlled magnetic pressure is applied to the work piece without physical contact, thereby eliminating undesirable application of heat, tool marks, contamination, etc. incurred in traditional forming or bending processes. In one embodiment, a magneform 7,000 model machine (Maxwell Laboratories, Inc., San Diego, Calif., U.S.A.) may be used for the cold forming processes described herein.

The basic magnetic pulse principal of magneforming is believed to be the same as that which activates a simply electric motor. When an electric current generates a pulse magnetic field near a suitable metal surface, a controllable pressure is created which can reshape metals without physical contact.

Figure 4:
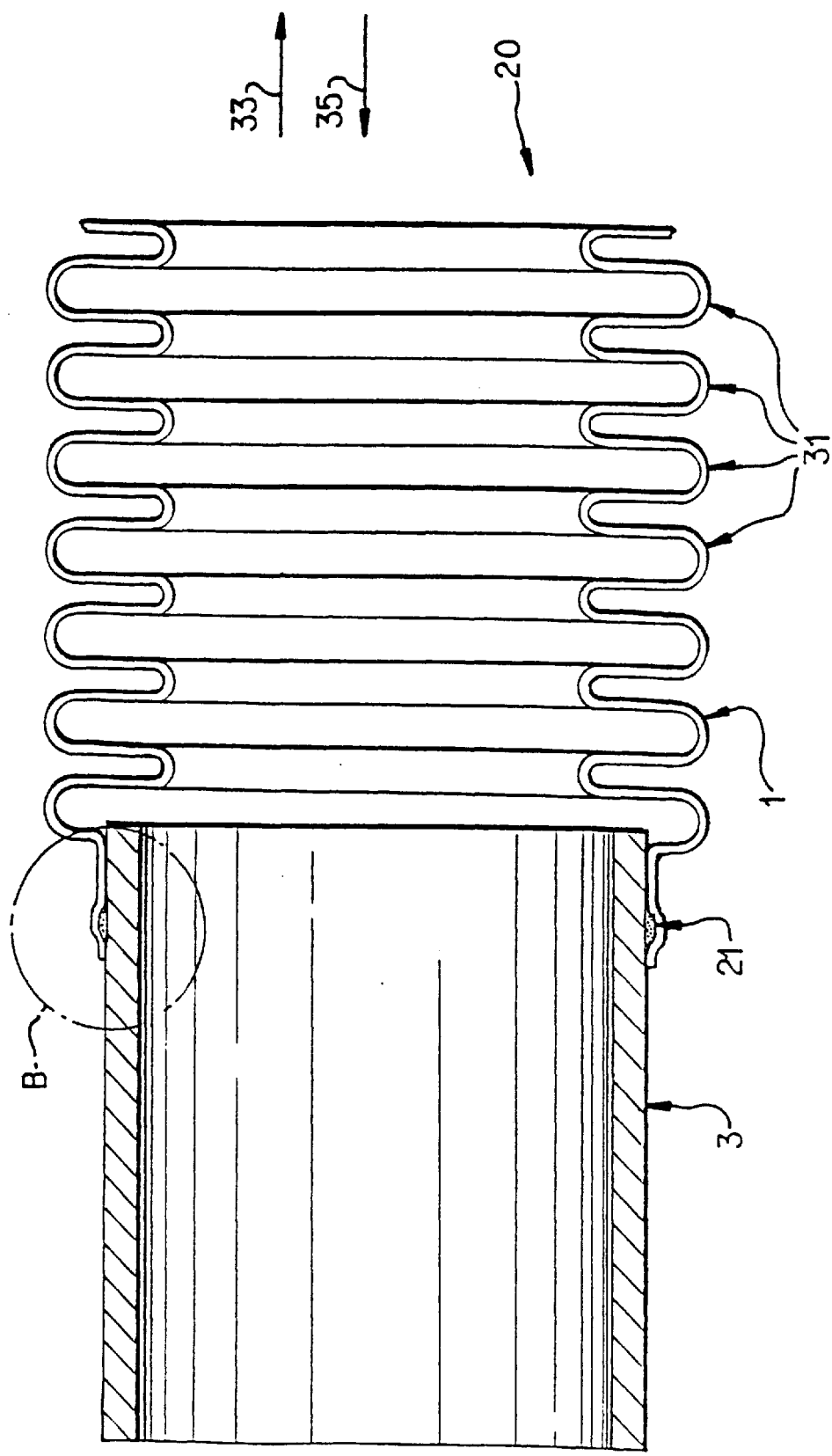
FIG. 4 depicts the assembly of FIG. 2 after heat has been applied to it (Scale 2:1).
Figure 5:
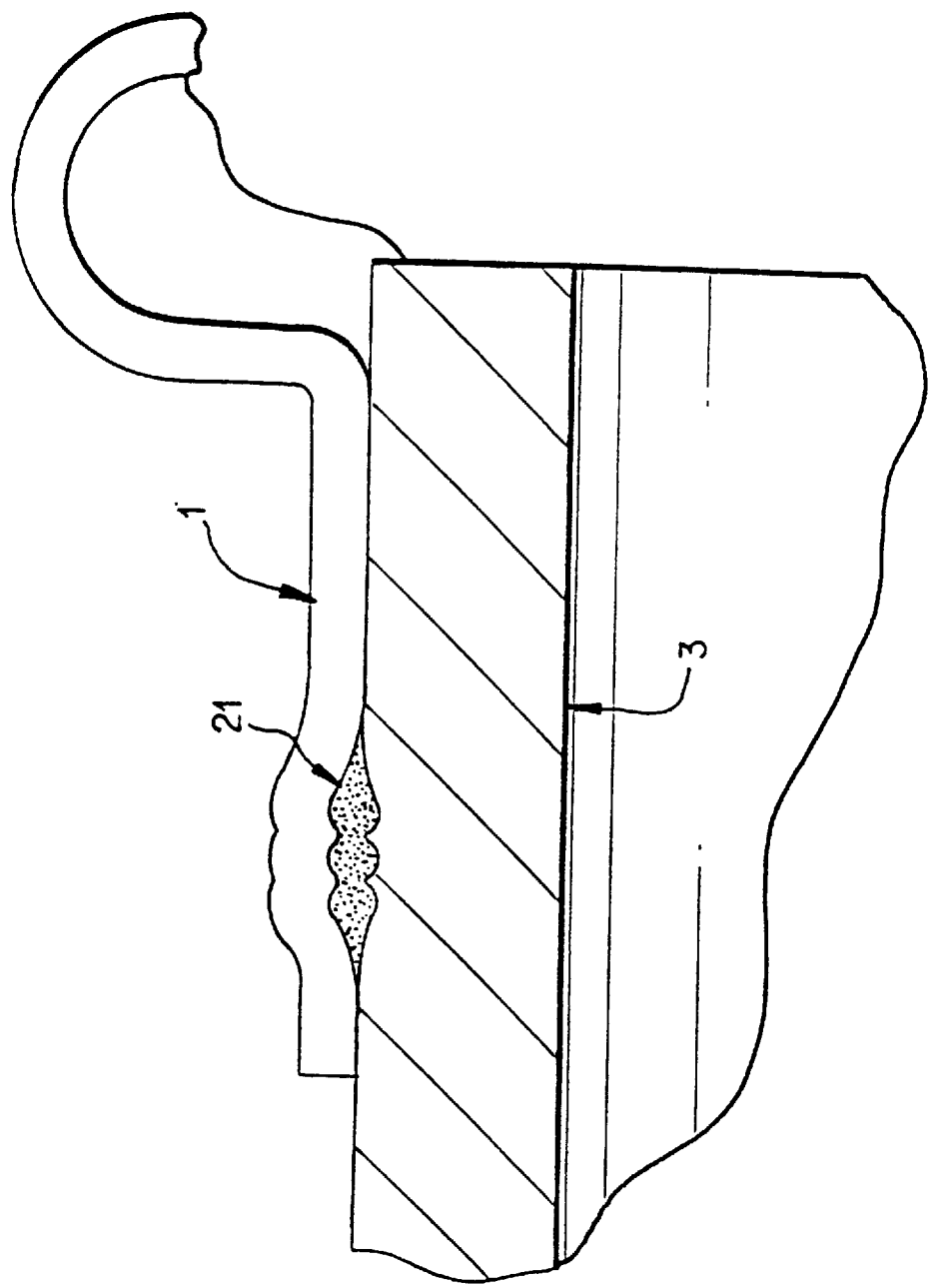
FIG. 5 depicts an expanded view of section "B" in FIG. 4 (Scale 8:1).

A substantially airtight seal is preferably formed between the end conduit 3 and the section of convoluted conduit 1. In a preferred embodiment, the fill material 5 may be heated to form this substantially airtight seal. As shown in FIGS. 4 and 5, after heating, the fill material 5 may melt or soften to form a seal 21 between the end conduit 3 and the section of convoluted conduit 1.

The fill material 5 thus serves at least two purposes. First, the fill material 5 may facilitate formation of a substantially airtight seal between the section of convoluted conduit 1 and the end conduit 3 (e.g., by melting). Second, the fill material 5 may facilitate formation of a ridge. Fill material 5 may preferably comprise solder ring (e.g., pre-formed braze material such as "Sil-Fos" or "Easy Flow 25" by Lucas Millhaupt, Inc., Cudahy, Wis., U.S.A.), solder paste, glue or other adhesives such as hot melt adhesives and epoxy, or solder wire.

In another embodiment, one or more relatively hard rings or bands made of graphite, steel, stainless steel, or other materials may be used as the fill material. In this embodiment, when cold forming processes such as shown in FIG. 3 are applied, then the materials surrounding the fill material may form raised ridges, and a groove in which one or more rings may lie. As such, the rings may act as a ring gasket to provide a substantially airtight seal.

FIG. 5 is an expanded view of encircled section B in FIG. 4. Preferably the heating applied to form the substantially airtight seal 21 is at temperatures low enough to prevent the section of convoluted conduit 1 or the end conduit 3 from annealing. It is believed that annealing significantly weakens the tensile strength of the materials being annealed. As such, if such heating can be performed at relatively low temperatures, annealing can be prevented and thus tensile strengths of the materials heated can be maintained. In a preferred embodiment the heat is applied by induction brazing, which is preferable because heat may be controlled and localized, thereby inhibiting unwanted conductive heat transfer and associated annealing. In other embodiments heat may be applied by a flame or via an oven.

The steps outlined above and in FIGS. 1–5 result in a conduit 20 comprising an end with an outer surface. This conduit 20 may also be formed in different embodiments and using different methods. The word "convoluted" in this context means grooved, helical, spiral, or annular/corrugated conduit. The word "conduit" is defined to include a pipe, duct, fitting, joint, etc., and a conduit may have rectangular, circular, square, oval, or irregular cross-sections. The conduit 20 may be formed without cold forming methods. For instance, the convoluted conduit 1 may be brazed or welded to end conduit 1. Furthermore, the fill material 5 need not be solder or solder rings, but instead can include solder paste or glue.

Figure 6:
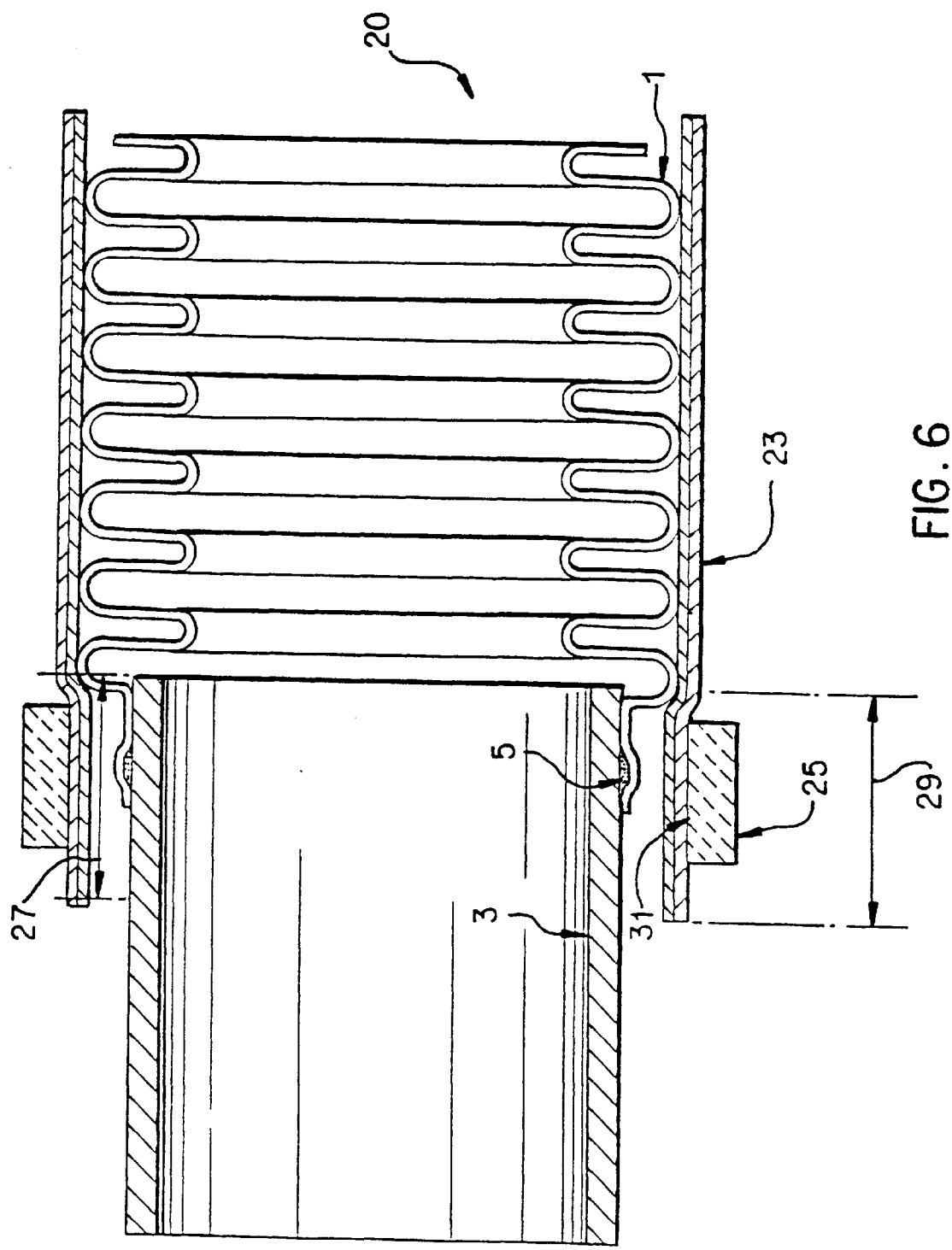
FIG. 6 depicts a convoluted conduit assembled together with a braid and a grip ring (Scale 2:1).

Once a conduit 20 is prepared, it may then be assembled with a braid 23 and a grip ring 25 such that an outer surface 27 of the conduit 20 is substantially surrounded by a portion 29 of the braid 23. In turn, at least part 31 of the portion 29 of the braid 23 is substantially surrounded by a portion of the grip ring 25. See FIG. 6.

A grip ring is defined to be a section of material that is bendable or moldable by cold forming processes, and that is shaped to substantially surround at least a portion of the braid 23. The grip ring may be longer or shorter, and/or thinner or fatter, than grip ring 25 shown in the Figures. For instance, it may be the shape of the additional material 61 shown in FIGS. 8–9. The grip ring 25 may made of metals, polymers, plastics, fibrous materials, or composite materials.

A braid is defined to be a network of elongated materials intertwined or interwoven with each other. For instance, a braid may comprise a network of fibers or wires woven in a criss-cross or cross-hatch pattern.

Figure 7:
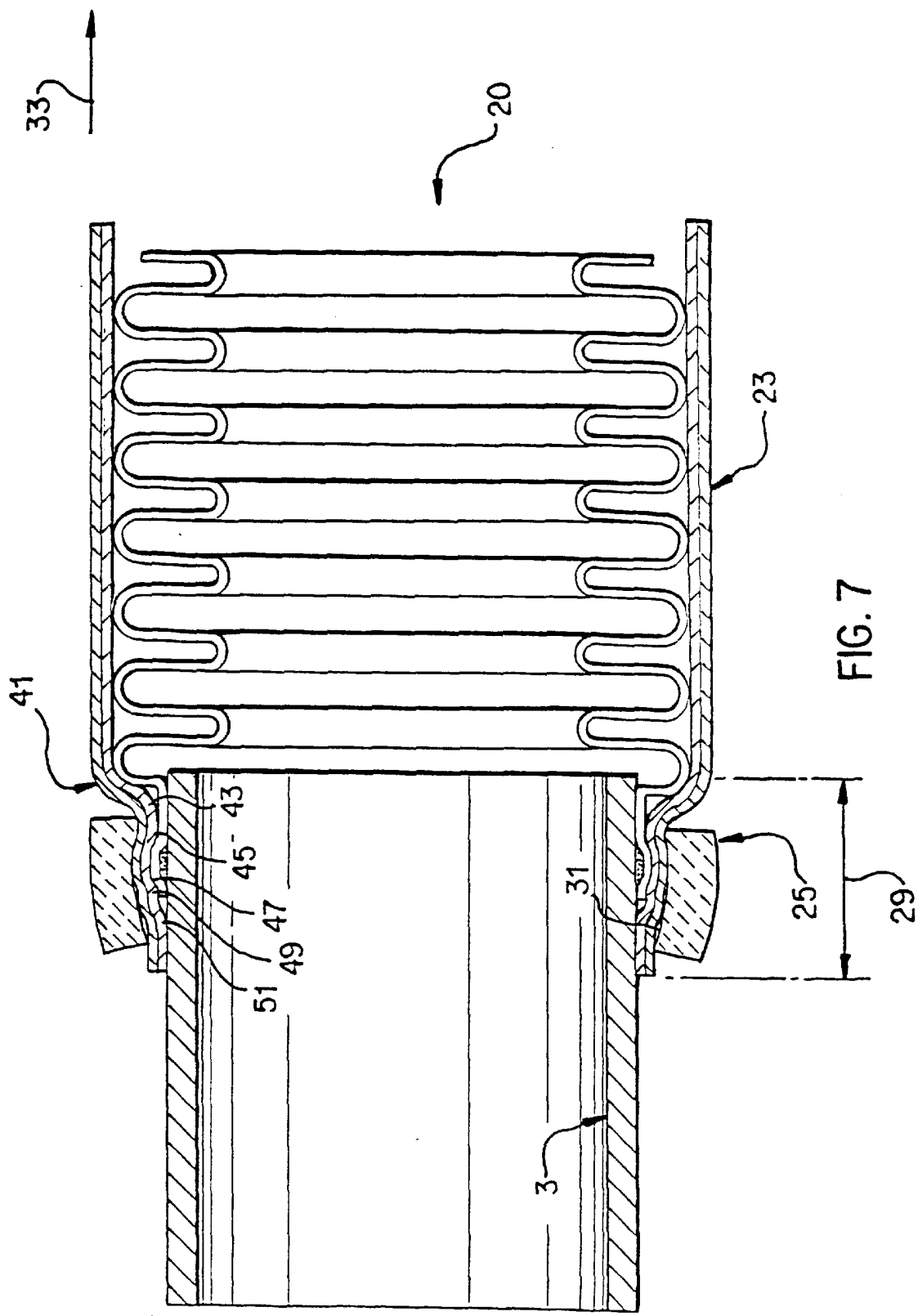
FIG. 7 depicts the assembly of FIG. 6 after it has been cold formed (Scale 2:1).

As shown in FIG. 7, in a preferred embodiment the assembled braid 23, end 3, and grip ring 25 is cold formed such that at least a portion of the grip ring 25 is compressed onto at least part 31 of the portion 29 of the braid 23. In this manner, at least part 31 of the portion 29 of the braid 23 is held by friction between the outer surface of the end 3 and at least a portion of the grip ring 25.

In a preferred embodiment the grip ring 25 may be cold formed such that it holds the braid 23 by friction between a portion of the grip ring 25 and a part of the section of conduit 1. This part is preferably a convolution proximate the end conduit 3.

As shown in FIG. 7, cold forming tends to thicken and compress the grip ring 25 onto the braid 23. In this manner, the braid 23 is squeezed between the grip ring 25 and the conduit 20. Again, preferably the cold forming is by magneforming because of the advantages provided by magneforming which are described above. In addition, in a preferred embodiment the grip ring 25 is sized such that its diameter after cold forming is at least ⅔ of its diameter prior to cold forming. In this manner wrinkling of the grip ring 25 or of the other materials may be inhibited.

Cold forming methods provide a significant advantage when preparing conduits covered with braids. Such conduits with braids, the braids themselves, the additional material, and/or the grip rings may be typically made of metals such as copper, bronze, steel, stainless steel, aluminum, etc.

Braids are typically used to provide additional pressure strength to the convoluted conduits. As the convoluted conduit is pressurized, the convolutions, which provide flexibility to the conduit, become a disadvantage in that they tend to longitudinally expand under pressure. For instance, if the assembly in FIG. 4 was pressurized beyond a relatively low pressure, then the convolution 31 would begin to expand in directions 33 and 35. To prevent such expansion, braids 23 may be used to cover the convolutions 31. Thus braid 23 contributes to the longitudinal stability (and pressure stability) of the conduit by inhibiting longitudinal expansion of convolutions 31. The ability of braid 23 to prevent the expansion of convolutions 31 under pressure is dependent upon the strength of the braid 23 itself and the strength of the coupling force between the braid 23 and the end conduit 3.

In the past, braids 23 have been coupled to conduits 3 by brazing or welding these braids 23 to the end conduit 3. In the brazing or welding process, however, the braid material, which is typically made of a multitude of individual wires or fibers, has become annealed, thereby significantly weakening the strength of the braid materials. The end conduit 3 may also become annealed. Since the braid materials are usually significantly thinner than the end conduit materials, the braid materials have in the past usually failed first. As a result of braid material failure caused by annealing of the braid, practitioners have used braids that were heavier and thicker (and more expensive) for the entire braid since the weak point (the braze point) had to maintain a minimum level of tensile strength after brazing.

Practitioners have also attempted to clamp braid 23 to end conduit 3. These attempts, however, have been largely unsuccessful since the clamping force has usually not been strong enough to bind the braid 23 to the conduit 3 when the braid is subjected to longitudinal pressure exerted by the convolutions 31 under pressure. In the embodiments described in this application, however, braid 23 has been found to adequately couple to the conduit 3 under pressure.

It is believed that one factor contributing to adequate coupling of the braid 23 to the end conduit 3 includes the bending of the braid under the cold forming processes. As shown in FIG. 7, braid 23 includes bends 41, 43, 45, 47, 49, and 51. Each bend in the braid provides additional resistance to the braid "pulling out" in direction 33 from under the grip ring 25. Just as a mountain climber can support a heavier companion with her weight by wrapping the connecting rope around a tree, the braid 23 can withstand additional pulling force in direction 33 because of the multiple bends 41, 43, 45, 47, 49, and 51 (this pulling force usually occurs when the convolutions are pressurized and they then attempt to expand). In this regard, raised ridges 15 and 17 all contribute to adding additional bends to the braid 23, thereby increasing the frictional hold of the grip ring 25 on the braid 23. In a preferred embodiment, at least one of the bends is at least at a 30–45E angle. As the angle of the bend increases, the resistance to braid 23 being pulled in direction 33 also tends to increase.

Another contributing factor to the coupling force between braid 23 and end conduit 3 is the effectiveness of magneforming versus other cold forming processes. By magneforming the assembly, the amount and direction of compressive force on grip ring 25 can be controlled without physically contacting the grip ring 25. As a result, little or no surface contamination, heat deformation, or tool marks result. Furthermore, magneforming allows the grip ring 25 to be uniformly compressed, thereby providing a more uniform frictional hold on the braid 23.

One of the advantages provided by the methods and conduit described herein is that the convolutions are not brazed or otherwise fixably bound when the braid 23 is coupled to the conduit 20. As shown in FIG. 10, one of the disadvantages of providing a braze joint was that the convolution 121 which was proximate the braze joint tended to become fixably bound and annealed during the brazing process. As a result, that convolution 121 could not fully flex when the conduit was bent and the convolution 121 was annealed at a point at which flexing forces were to be applied. In addition, forces applied to the convolution 121 during flex were concentrated in the portions of the convolution 121 that were not fixably bound. The conduits thus tended to fail at or near convolution 121. In the conduits described herein, however, no brazing is necessary to couple the braid 23 to the conduit 20. As a result, the convolution proximate the end conduit 3 (see FIG. 9) is not annealed and the forces applied to this convolution may be distributed substantially evenly throughout that convolution, instead of being concentrated in the portions of the convolution that is not fixably bound.

In a preferred embodiment, the outer diameter of the conduit 20 includes at least one section which is greater than the outer diameter of the end conduit 3. In this manner, the braid may be bent so that it lies both against the outer diameter of the conduit and the outer diameter of the end. See FIG. 7 and bends 41 and 43. Furthermore, the braid 23 may be bent so that it substantially conforms to the shape of the interface region between the conduit and the end 3.

Figure 8:
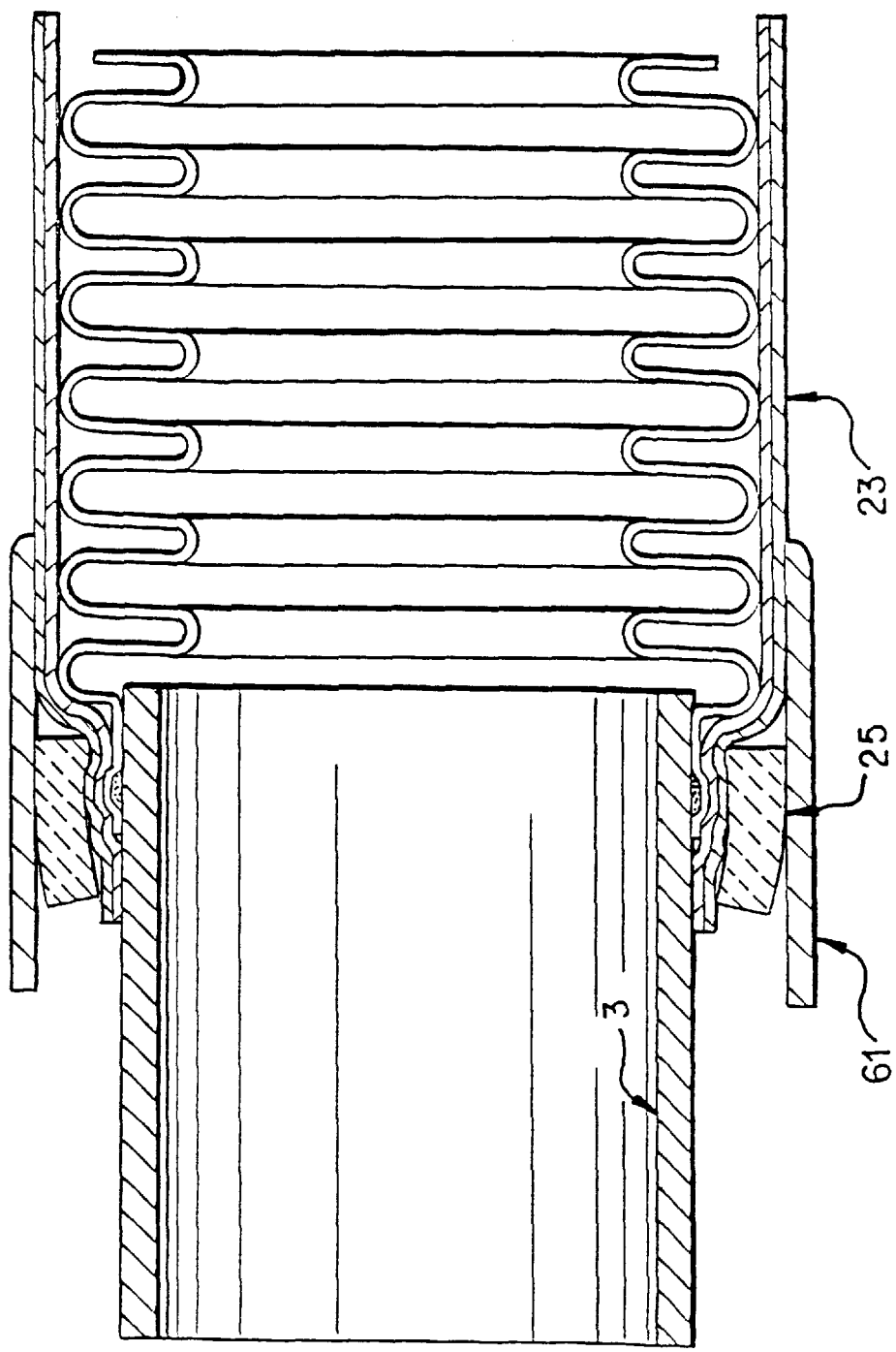
FIG. 8 depicts additional material such as a ferrule assembled together with the cold formed assembly of FIG. 7 (Scale 2:1).

In a preferred embodiment, further additional material, such as a ferrule or additional grip ring, may be applied to at least one portion of the grip ring 25 or the braid 23. As shown in FIG. 8, this additional material 61 may be placed adjacent to the grip ring 25 and/or the braid 23. The additional material used in any application may be longer or shorter, and/or thinner or thicker, than the additional material 61 shown in FIG. 8. Furthermore, the additional material used in any application may not necessarily cover the grip ring 25, the braid 23, and/or the end 3.

Figure 9:
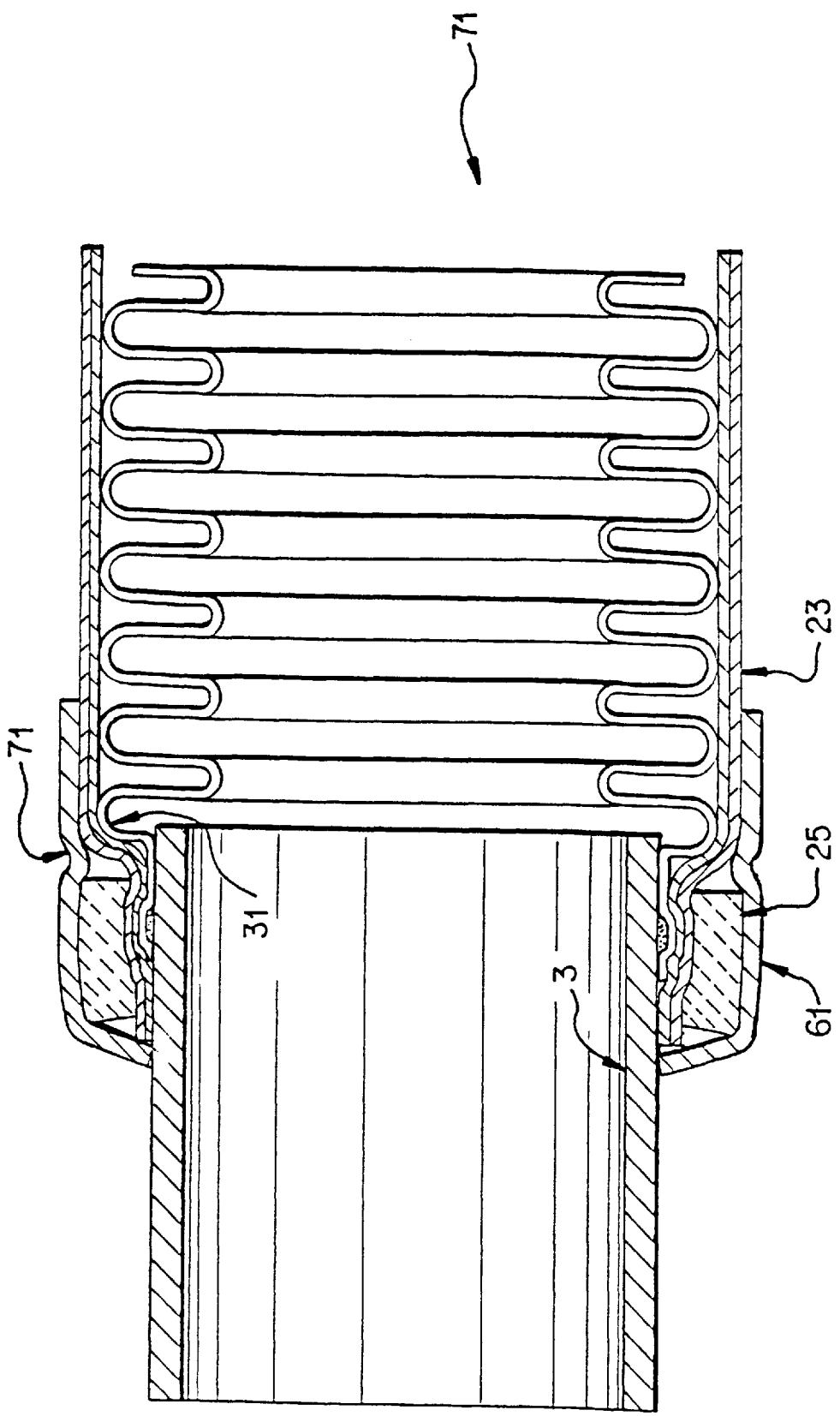
FIG. 9 depicts the additional material of FIG. 8 after it has been cold formed onto the cold formed assembly of FIG. 7 (Scale 2:1).
Figure 10:
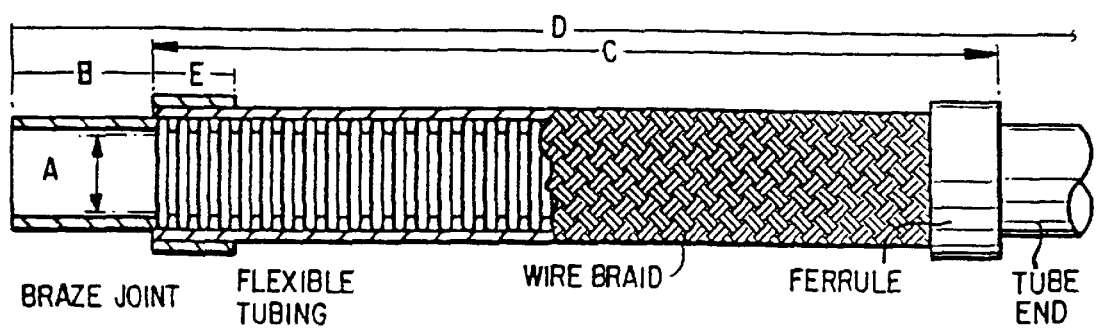
FIG. 10 depicts a section of flexible conduit covered with braid, the flexible conduit being connected to the braid, ferrule, etc. by known methods (brazing) (A=inside diameter, B=tube end length, C=flexible tubing length, D=overall length, and E=ferrule length).

As shown in FIG. 9, the additional material 61 may be cold formed in a preferred embodiment onto the end 3, the grip ring 25, and/or the braid 23. The additional material 61 provides a smooth and aesthetically pleasing appearance to the outer surface of the assembly 71 (a smooth outer surface is desirable to prevent scraps and scratches when the assembly is handled). In addition, the additional material 61 provides a supplemental compressive force against the end conduit 3, braid 23, and grip ring 25. This supplemental compressive force provides supplemental holding force against the braid 23. Specifically, section 71 of the additional material 61 provides a supplemental compressive force against the braid 23 located against convolution 31 of the conduit 20.

As shown in FIG. 9, in a preferred embodiment the additional material 61 is locked onto the grip ring 25 and the braid 23. The additional material 61 preferably applies compressive force directly against the braid 23 at points 115 and 117, which are located on either side of the grip ring 25. The additional material 61 preferably includes bend 111 which serves to inhibit slippage of the additional material 61 in direction 35. Furthermore, the additional material 61 preferably includes bend 113 which serves to inhibit slippage of the additional material in direction 33. Additional material is thus locked in place via the combination of the bends 111 and 113, and the compressive force applied during the cold forming process.

In a preferred embodiment the cold forming processes apply sufficient force to emboss or embed the braid material into the additional material 61, the end conduit 3, the grip ring 25, and/or the convolution 31. For instance, in the embodiments shown in the FIGS. 1–9, if the parts are disassembled it is possible to view a braid pattern embedded into the additional material 61, the end conduit 3, the grip ring 25, and/or the convolution 31. This embedding or embossing of the braid further prevents the braid from disengaging from or slipping away from the additional material 61, the end conduit 3, the grip ring 25, and/or the convolution 31.

Figure 11:
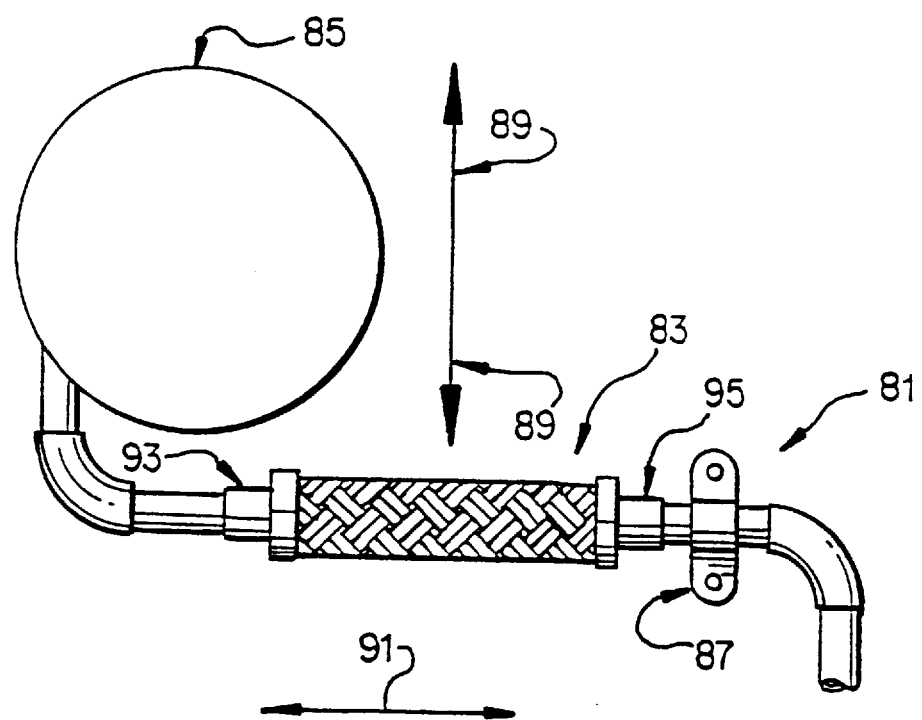
FIG. 11 depicts a section of flexible conduit in a vibration absorption system.

FIG. 11 depicts a vibration absorbing system 81 including a flexible conduit 83 covered with a braid. The system 81 may be connected into either the inlet or outlet lines to a pump or compressor 85. The system 81 may be connected such that vibrations from the pump or compressor 85 are maximized in a first direction 89, and wherein the conduit 83 is longitudinally connected in a second direction 91 which is substantially perpendicular to the first direction.

Preferably the conduit 83 has a first end 93 and a second end 95, the first end 93 being closest to the pump or compressor 85 and the second end 95 being distant from the pump or compressor. In a preferred embodiment second end 95 is anchored with anchoring system 87 to prevent movement.

In a preferred embodiment the conduits described herein may be incorporated into vibration absorbers connected to other equipment such as pumps or compressors. The conduits described herein may be used to make pump connectors or compressor connectors.

Given that relatively high pressure (e.g. at least about 2000 or 2500 p.s.i.g.) braided conduits may now be prepared with cold forming processes, it is expected that new, better, and/or less expensive materials may be used for the conduits, the end conduit, the braids, etc. For instance, it is expected that the conduit, end conduit, braids etc., may comprise materials such as graphite fibers, cloth, plastic, kevlar, nylon, fiberglass, and other materials that previously could not be used because of the high temperatures involved in making braze joints.

Another advantage with the conduits prepared with cold forming processes is that the cold forming can be much less labor intensive and cleaner. For instance, magneforming can be performed by equipment and, unlike "hot" techniques such as welding or brazing, it does not leave spurs and marks that have to been cleaned.

In the applications described above, the section of convoluted conduit 1 is applied onto the end conduit 3. It is to be understood that the placement of these materials, as with the placement of the other materials such as the braid 23, the grip ring 25, and the additional material 61, may be reversed, interchanged, switched, or differed in various applications. In certain applications different order of materials may be desirable to check for leaks, reduce flow restrictions in the resulting conduit, aesthetics, etc.

Experimental Results
Experiment #1—Known Conduits

For comparative purposes, flexible convoluted conduit units were made which corresponded to the conduit shown in FIG. 10. These units correspond to model number VAF-8 made by Packless Industries (Waco, Tex., U.S.A.). Each unit was made with ¾ inch (about 19 mm) inside diameter red brass conduit hose with corrugated convolutions. Each convolution had a maximum outside diameter of 1.2 inch (about 30 mm), and a minimum outside diameter of 0.786 inch (about 20 mm). The convoluted conduit hose was approximately 9 inches (about 229 mm) in length (dimension "C" in FIG. 10), and included 7 convolutions per inch (about 25 mm). Each conduit hose included two copper end conduits which were 1.25 inches (about 32 mm) in length (dimension "B" in FIG. 10), and each end of each conduit was covered with a ⅝ inch (about 16 mm) length copper ferrule (dimension "E" in FIG. 10). Bronze braid type "48-5" (e.g., 48 strands of wire with five wires per strand) were used. Braze material made of about 65 percent copper and 35 percent zinc (also known as "muntz metal") was used to braze the braid to the end of the conduit.

When hydraulically pressure tested, three conduit units of FIG. 10 failed at 2600, 2400, and 2600 p.s.i.g. (about 179, 165, and 179 bar), respectively. These units met the United Laboratories, Inc. ("UL") standard of being able to withstand 2200 p.s.i.g. (about 152 bar) for one minute. The tests were conducted by pressurizing to 2100 p.s.i.g. (about 145 bar) for one minute, then gradually increasing the pressure to 2300 p.s.i.g. (about 159 bar) and holding for one minute, and then gradually increasing the pressure to failure (for the conduit that failed at 2400 p.s.i.g. (about 165 bar)) or 2500 p.s.i.g. (about 172 bar) and holding for one minute, and then gradually increasing the pressure until failure. Each of the failures was due to the braid breaking at or near the point that it was brazed to the end of the conduit.

Experiment #2—New Flexible Conduits

Two conduit units were made in a manner as shown and described in FIGS. 1–9. Cold forming was performed by magneforming. The conduit materials were identical to the brazed conduit materials described in Experiment #1, except that a copper grip ring of 1.29 inch (about 33 mm) initial inside diameter and 0.312 inch (about 8 mm) length was used as described in connection with FIGS. 6–9. These two conduit units did not fail until 2750 (about 190 bar) and 2850 p.s.i.g. (about 197 bar). Significantly, the failure was due to the end conduit fitting breaking, not failure of the braids at or near the connection point to the end conduit.

Experiment #3—Flexible Conduits With Reduced Diameter Braid Wires.

Instead of testing new conduit units with higher pressure fittings, additional tests were directed at determining if reduced braid wire sizes could be used with the methods described herein to prepare a more cost efficient, lighter, and stronger flexible conduit. In these tests, 12 conduits were made according to the method described for Experiment #2 except that braid wires were reduced to 0.010 inch (about 0.25 mm) diameter 304 stainless steel instead of the 0.021 inch (about 0.53 mm) diameter bronze material used in Experiment #2. Tests were conducted by pressurizing to 2100 p.s.i.g. (about 145 bar) for one minute and then increasing the pressure to 2500 p.s.i.g. (about 172 bar) for one minute. The pressure was then increased until failure. The average failure, as shown below, was about 2700 p.s.i.g. (about 186 bar).

| Unit #1 | Failure Point 2600 p.s.i.g. (about 179 bar) |
| #2 | Failure Point 2800 p.s.i.g. (about 193 bar) |
| #3 | Failure Point 2650 p.s.i.g. (about 183 bar) |
| #4 | Failure Point 2650 p.s.i.g. (about 183 bar) |
| #5 | Failure Point 2750 p.s.i.g. (about 190 bar) |
| #6 | Failure Point 2700 p.s.i.g. (about 186 bar) |
| #7 | Failure Point 2800 p.s.i.g. (about 193 bar) |

-continued

| #8 | Failure Point 2650 p.s.i.g. (about 183 bar) |
| #9 | Failure Point 2700 p.s.i.g. (about 186 bar) |
| #10 | Failure Point 2650 p.s.i.g. (about 183 bar) |
| #11 | Failure Point 2750 p.s.i.g. (about 190 bar) |
| #12 | Failure Point 2700 p.s.i.g. (about 186 bar) |

In Unit #1 the test fitting failed at 2600 p.s.i.g. (about 179 bar), thereby preventing any test on the braid, etc. connections.

Since the diameter of the stainless steel braid wire in Experiment #3 (0.010 inch (about 0.25 mm)) was less than one-half the diameter of the bronze braid wire of Experiments #1–2 (0.021 inch (about 0.53 mm)), the mass of stainless steel braid wire in Experiment #3 was less than 25% of the mass of the bronze braid wire in Experiments #1–2. If the diameter of wire is halved, then the weight of wire is reduced by 75%, without accounting for differences in density between 304 stainless steel and bronze (304 stainless steel has a density about 5–10% lower than the density of bronze).

The stainless steel wire in Experiment #3 had a tensile strength of 80,000 p.s.i. (about 5516 bar), which is greater than the tensile strength of the bronze wire (47,000 p.s.i. (about 3241 bar)) in Experiments 1–2.

Since the tensile strength of the stainless steel wire was approximately 70% greater than the tensile strength of the bronze wire, it would be expected that about 47,000/80,000 (3241/5516) (about 59%) of the stainless steel mass would be needed to achieve the same results as the bronze wire braid of Experiment #1. In fact, however, the mass of stainless steel braid actually used in Experiment #3 was much less. It was less than 25% of the mass of bronze wire braid used in Experiment #1. As a result, when the conduit made in Experiment #3 is compared on an effective mass per tensile strength basis to the conduit made in Experiment #1, it was found that less than ½ of the mass of equivalent braid wire was required to achieve equal or greater effective tensile strengths (effective tensile strength meaning the tensile strength of the braid when used on the conduits). For instance, even accounting for the increased tensile strength of the stainless steel wires in Experiment #3, the conduits of Experiment #3 still withstood higher average pressures than the conduits of Experiment #1—and the conduits of Experiment #3 did so with less than one-half of the mass of braid wire!

The above experiments show that significant savings in weight and cost may be achieved while at the same time achieving failure pressures in excess of the failure pressures achieved with known conduits. For instance, given that only about 25 percent of braid material was used (as compared to Experiment #1), then this conduit can be prepared with about a 27 percent savings in materials costs, even considering the higher cost of the stainless steel in Experiment #3. Further significant savings in labor can also be achieved, given that the cold forming processes, which can be automated, can be significantly less labor intensive than "hot" forming processes such as welding or brazing. For instance, when brazing is used, it is usually substantially "by hand" and further significant additional labor must be employed for cleaning of excess "muntz metal" after the brazing process is complete. It is estimated that labor costs for preparing conduit such as described in Experiment #3 can be reduced by about 40–60 percent over conduit brazed together as described in Experiment #1.

Experiment #4—Flexible Conduits With Reduced Dia. Braid Wires.—No Additional Material 61 (I.E., No Ferrule)

Three convoluted conduits were made as described in Experiment #3 except that these conduits did not include the additional material 61 shown in FIGS. 8–9 and described in the accompanying text. When tested in the manner described in Experiment #3, these conduits failed between 2250 and 2400 p.s.i.g. (about 155 and 166 bar).

Experiment #5—Flexible Conduits With Reduced Dia. Braid Wires.—Grip Ring 25 in Shape of Additional Material 61

Three additional conduits were made as described in Experiment #4 except that the grip ring 25 was modified so that it was the same shape as the additional material 61 shown in FIGS. 8–9. When tested in the manner described in Experiment #3, these conduits did not fail until 2750 p.s.i.g. (about 190 bar). These tests indicate that the additional material 61 shown in FIGS. 8–9 may not be necessary if the shape of the grip ring 25 is modified to be longer and cover a greater proportion of the braid 23 and/or the convolutions (e.g. convolution 31).

Further Improvements

In an alternate embodiment of the invention, a covered conduit may be made to hold high pressures without applying heat to the conduit and without fill material. An advantage of such a covered conduit is that it is not weakened due to heat. In addition, such a covered conduit is generally easier and less expensive to fabricate because heating or other hot forming processes (e.g., welding, brazing and/or soldering) are not required at all.

Figure 12:
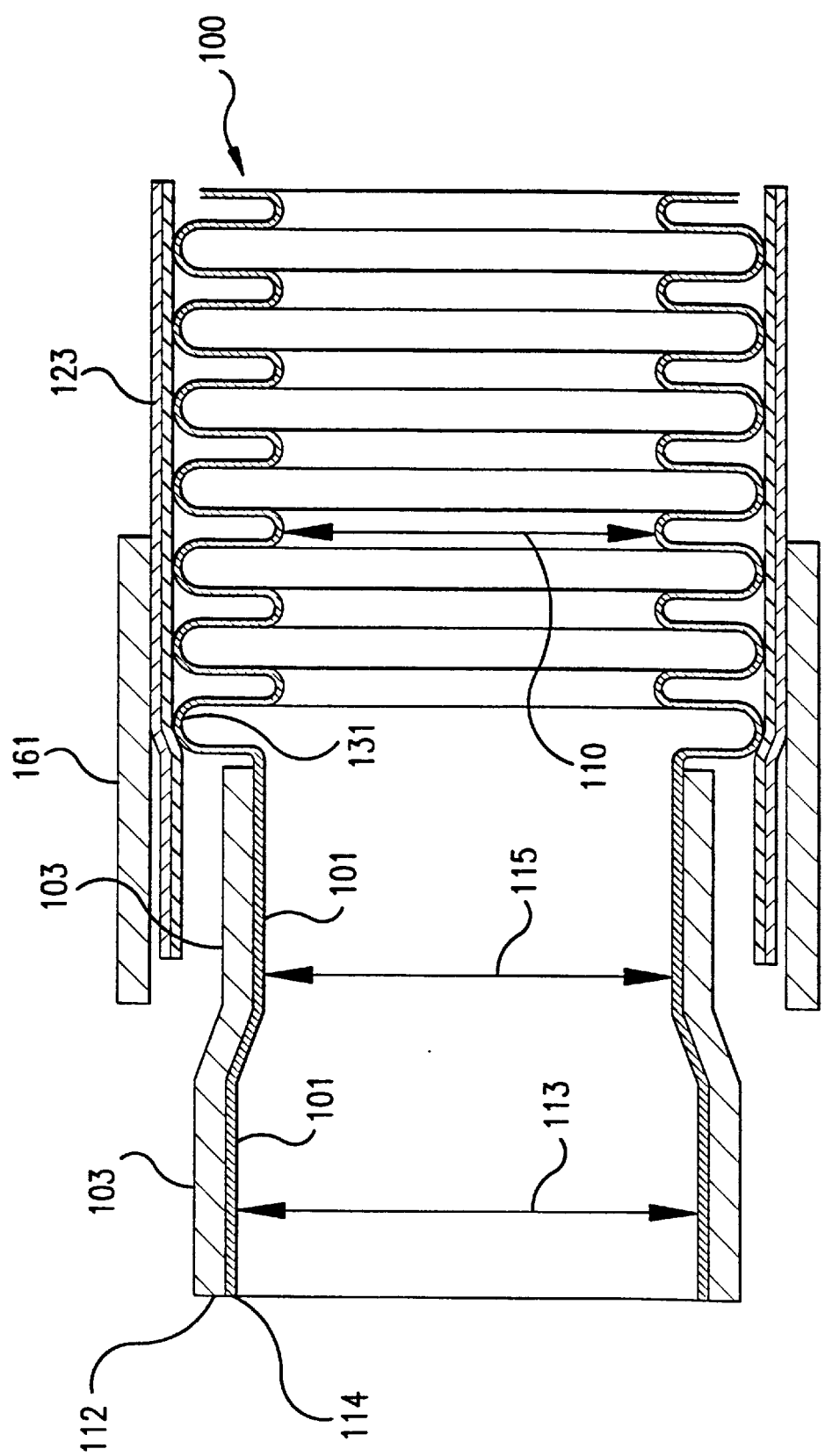
FIG. 12 depicts a section of conduit assembled with an end section, an end conduit, a braid, and additional material.

As shown in FIG. 12, in an alternate embodiment of the invention a section of uncovered convoluted conduit 100 may be coupled or connected to an end conduit 103.

End conduit 103 may be coupled to uncovered convoluted conduit 100 by adhesive, heated fill material (see, e.g., above discussion and FIGS. 1–5), hot forming processes, screw threads, flanges, brackets, or with other connectors known in the art. In a preferred embodiment, however, end conduit 103 is mechanically coupled to convoluted conduit 100 by friction and without heat forming processes.

Specifically, as shown in FIG. 12, a section of convoluted conduit 100 may include a section of substantially unconvoluted conduit 101. As shown in FIG. 12, this section 101 may be arranged inside end conduit 103. Preferably section 101 is arranged inside end conduit 103 such that little or no portions of end conduit 103 are directly exposed to the materials contained within the walls of section 101, or the pressure contained within the walls of section 101.

End conduit 103 preferably has an inside surface slightly larger than the outside surface of section 101. In this manner end conduit 103 may be assembled outside of section 101 such that the interior of end conduit 103 is close to, in contact with, or in a frictional relationship with the outside surface of section 101. Once assembled outside of section 101, in one embodiment the end conduit 103 may be cold formed (e.g., magneformed) to form a frictional relationship between end conduit 103 and section 101. When such cold forming takes place, a mandrel or form may be inserted inside end section 101.

End conduit 103 and section 101 may individually or jointly be swaged (i.e., mechanically bent) to have a larger diameter (as shown in FIG. 12, such swaging may result in a section with a diameter 113 greater than the original diameter 115). Such swaging may be conducted before or after end conduit 103 is coupled to section 101.

As shown in FIG. 12, the braid 123, the convoluted conduit 100, the end conduit 101, and a portion of additional material 161 may be assembled such that (a) a portion of the braid 123 substantially surrounds an outer surface of the end conduit 103, (b) a portion of the braid 123 is between the end conduit 103 and the additional material 161, and (c) a portion of the braid 123 is between the convolution 131 proximate the end section 101 and the additional material 161. Such assembly may take place before or after end conduit 103 is coupled to end section 101.

Figure 13:
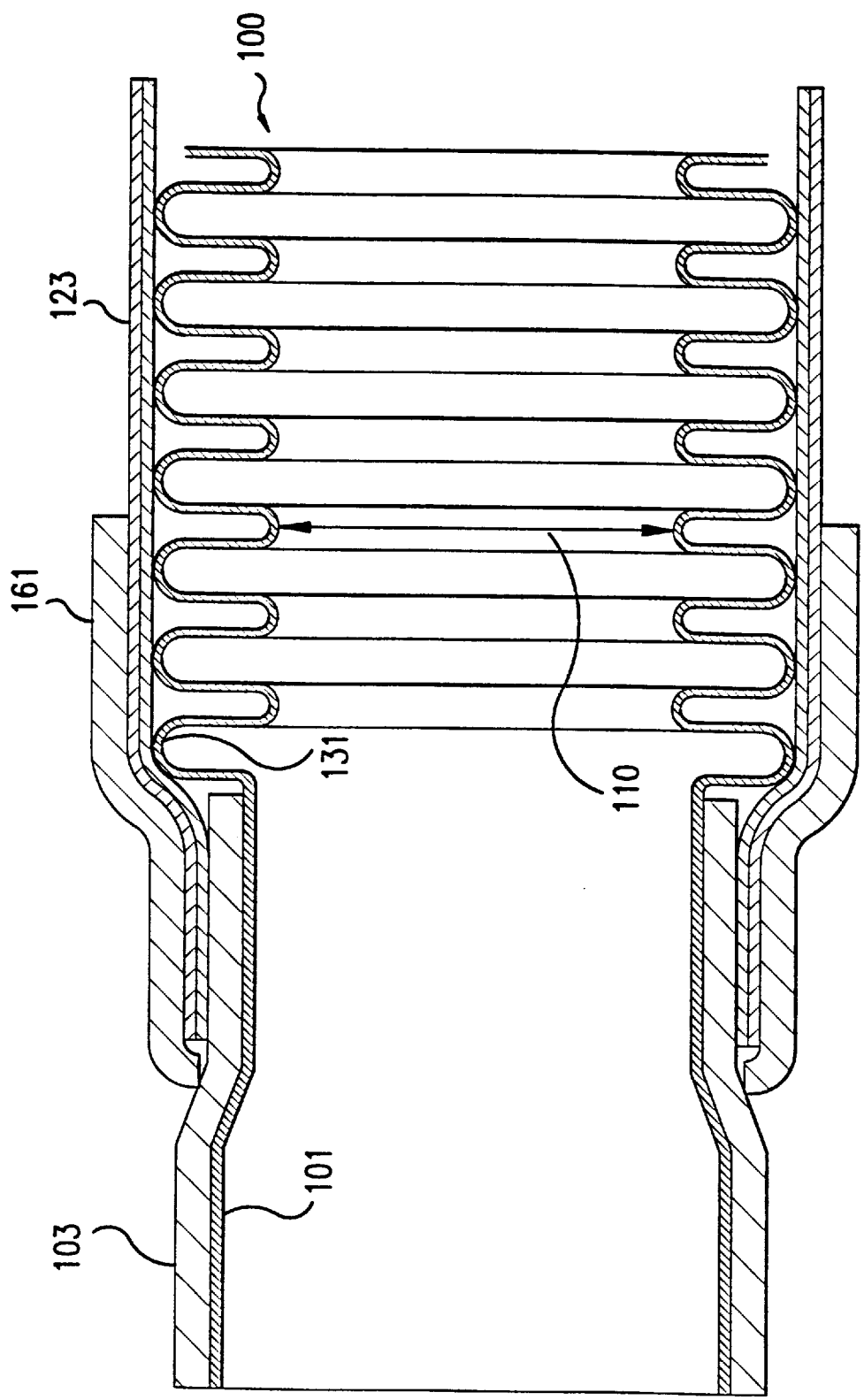
FIG. 13 depicts the assembled components from FIG. 12 after they have been cold formed to form a covered conduit.

As shown in FIG. 13, the assembled braid 123 and additional material 161 may be cold formed such that (a) at least a portion of the additional material 161 is bent onto a portion of the braid 123, (b) a portion of the braid 123 is held by friction between an outer surface of the end conduit 103 and at least a portion of the additional material 161, (c) a portion of the braid 123 is held by friction between an outer surface of the convolution 131 proximate the end section 101 and at least a portion of the additional material 161, and (d) the convolutions of the convoluted conduit 100 are not substantially deformed. In this context, it is to be understood that the convolutions may be slightly bent, however slight bends in the convolutions would still mean that the convolutions are "not substantially deformed."

Preferably, the length of the substantially unconvoluted end section 101 is at least as great as the smallest inner diameter 110 of the convoluted conduit 100. In this manner, if an edge 112 of the end conduit 103, or an edge 114 of the end section 101, should later be heat processed, then heat from such heat processing will generally be far enough away from the braid 123 and the additional material 161 such that these components are not substantially weakened by the heat.

In one embodiment, the end conduit 103 has a wall thickness which is at least twice the convoluted conduit 100 wall thickness. Such extra thickness is preferred for higher pressure applications. In one embodiment the section 101 has a thickness of about 10–25 mils and the end conduit has a thickness of about 60–90 mils (one thousand mils equals one inch). The portions of the convolutions which are covered by the braid 123 are strengthened by the braid 123, however some portions of the end section 101 are not covered by the braid 123. As such, a thicker end conduit 101 tends to add structural support to such uncovered portions of end section 101.

In one embodiment the cold forming may be conducted with a mandrel or other form inside of the components being cold formed (e.g., magneformed). In this manner, the "roundness" of the conduits and/or components may be maintained. Furthermore, the amount of shrink of the conduit and/or other components is limited by the mandrel or other form, thereby enhancing the frictional hold between the conduits and/or components being cold formed or "shrink-fit" to each other.

Figure 14B:
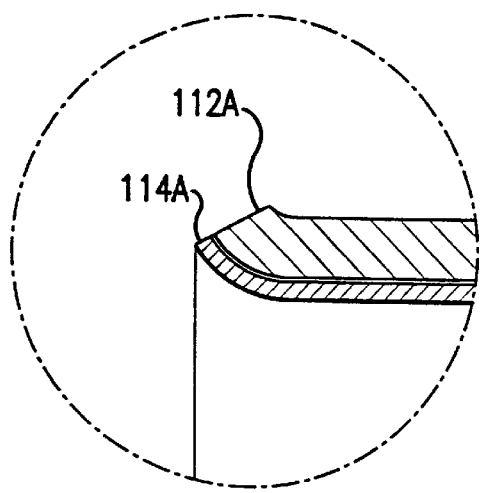
FIGS. 14 and 15 depict the covered conduit of FIG. 13 with flared ends.
Figure 14A:
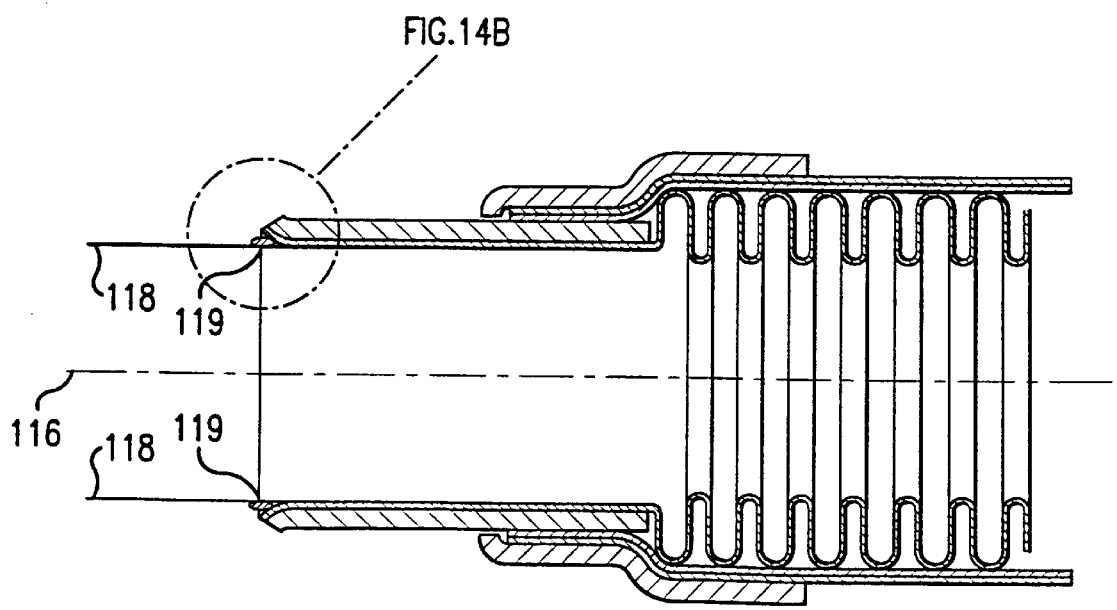
Figure 15B:
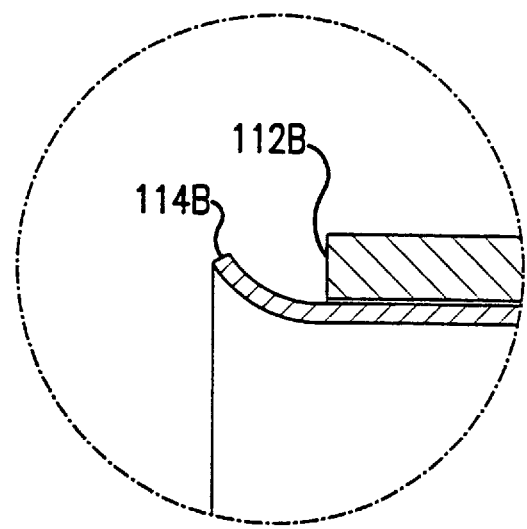
Figure 15A:
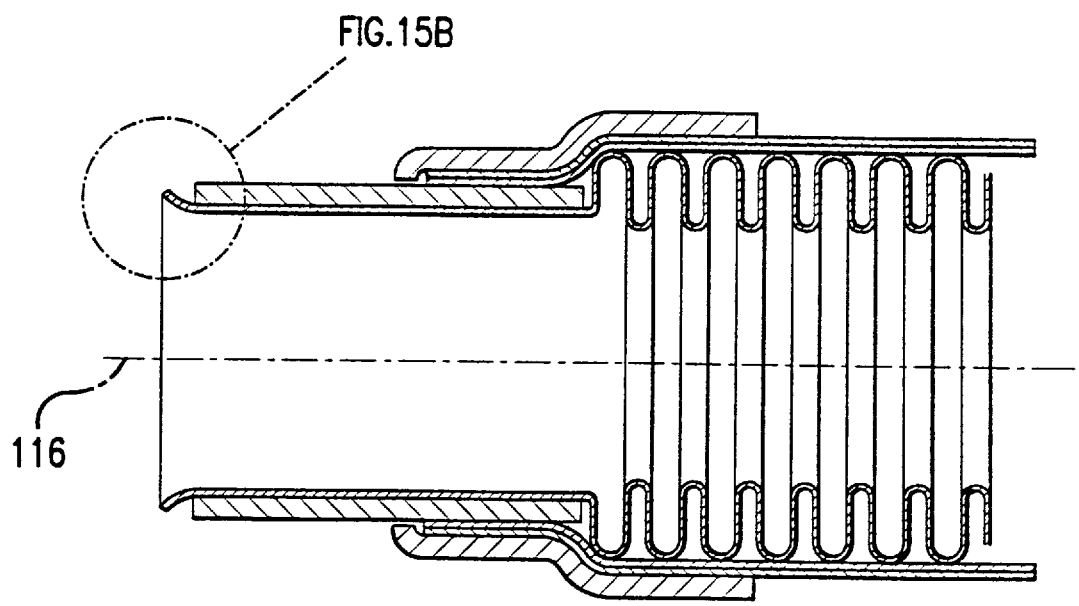

As shown in FIGS. 14–15, an edge 112A or 112B of the end conduit 103 may be formed such that this edge 112A or 112B flares outwardly from a center 116 of the end conduit 103 (or section 101). The purpose of this edge 112A or 112B is to facilitate subsequent coupling of the covered conduit to another conduit or end piece. As shown in FIG. 14, in a preferred embodiment a section of conduit 118 may be inserted inside of edge 114A or 114B and then coupled to the section 101 with a hot forming process at joint 119. Coupling conduit 118 to section 101 instead of 103 insures that fluid within conduit 100 cannot migrate outwards. Because edges 112A, 112B, 114A, and 114B are flared outwardly, an unskilled practitioner can easily tell that he/she has to place the conduit 118 on the inside, instead of the outside, of section 101.

Edges 112 and 114 may be formed by bending or swaging.

Figure 16B:
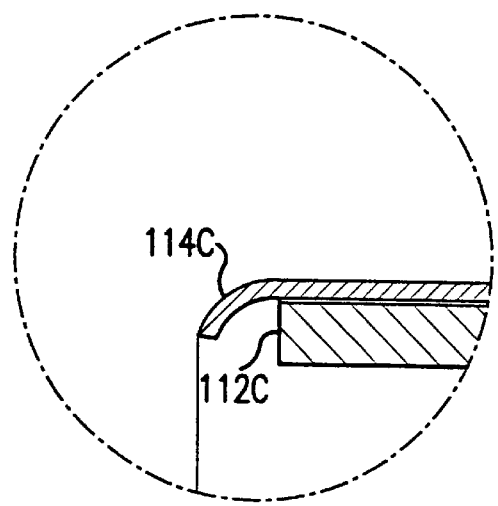
FIG. 16 depicts a covered conduit made with the end section between the end conduit and the braid, and with flared ends.
Figure 16A:
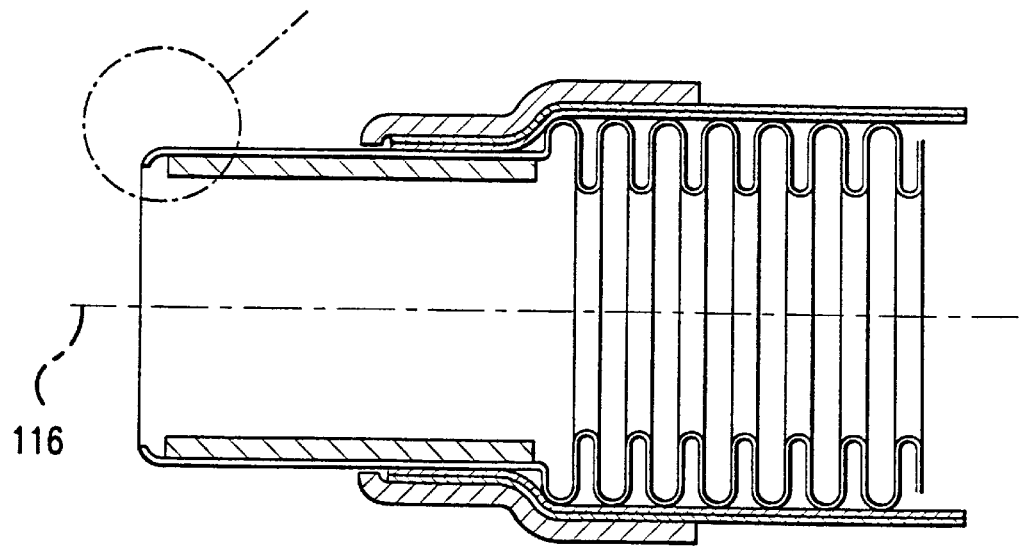

Alternately, as shown in FIG. 16, edges 112C and 114C can be formed such that they flare inwardly towards a center 116 of the end conduit 103. In this embodiment a practitioner would preferably insure that the conduit 118 was coupled to the outside, instead of the inside, of section 101.

Referring to FIG. 13, preferably the cold forming is conducted such that the braid 123 is bent against both the outer surface of the convolution 131 proximate the end section 101 and the outer surface of the end conduit 103, and at least a portion of the additional material 161 is bent such that it lies on top of the bent portions of braid 123. An advantage of such a configuration is that the braid 123 tends to be held more tightly between the additional material 161 and the convoluted conduit 100. The braid 123 may be cold formed such that the braid 123 is at least partially embedded into the end conduit 103, thereby also enhancing the frictional hold of the additional material 161 and end conduit 103 on the braid 123.

An advantage of the embodiment shown in FIGS. 12–15 is that neither the braid 123 nor any portion of the convoluted conduit 100 is heated when making the covered conduit. Thus if the assembled components are made of metal, they are not weakened by heat during assembly. In addition, assembly without costly heat processes tends to be easier and take less labor. In addition, when the assembled components are not heated, they may be made of other materials such as fibers, etc.. Since some materials may not be compatible for heat processing (e.g., some materials are cannot be easily welded or brazed together), the ability to couple dissimilar components together without heat processing is advantageous. For instance, it is anticipated that in one embodiment of the invention aluminum and copper components will be assembled with a Kevlar braid without heat processing. It is believed that such component and braid materials could not easily be assembled into a covered conduit using heat processes.

Another advantage of the embodiment shown in FIGS. 12–15 is that the convolutions of the convoluted conduit are not substantially deformed. In some processes covered conduits are made whereby at least some convolutions are substantially deformed. Such deformation, however, tends to significantly fixably bind and/or weaken the convolutions, thereby weakening the resulting covered conduit and lowering the maximum pressure rating of the resulting covered conduit. In addition, the deformation itself may tend to be unpredictable, thus leading to difficulties in consistently producing covered conduits.

In one embodiment, the convoluted conduit 100, the end conduit 103, the additional material 161, and the braid 123 include metal, but none of these components are welded (i.e., no hot forming processes are used) when making the covered conduit. In other words, no hot forming processes are used to couple the convoluted conduit 100, the end conduit 103, the additional material 161, and/or the braid 123. Such covered conduit may be adapted to contain a pressure of at least about 400 p.s.i.a. (about 27.5 bar), more preferably at least about 1000 p.s.i.a., 2000 p.s.i.a., 3000 p.s.i.a., or 4000 p.s.i.a., all at 60° C.

In one preferred embodiment, the braid includes flattened strips of metal. Such flattened strips of metal provide, among other things, a more pleasing appearance and less protruding sharp edges.

The convoluted conduit may be made by internally pressurizing a conduit so that portions of the walls of the conduit are bent to form raised convolutions. Alternately, the convoluted conduit may be made by indenting a conduit so that the walls bend inwardly, thereby forming convolutions. It is to be understood, however, that any convoluted conduit may be used to prepare a covered conduit as described herein.

Preferably the cold-forming mechanically couples the assembled braid 123, convoluted conduit 100, end conduit 103, and additional material 161 such that the covered conduit is substantially leak-proof without use of an adhesive. Formation of a covered conduit without an adhesive is advantageous because an adhesive may tend to melt at higher temperatures, thus preventing use of the covered conduit in relatively hot applications (e.g., exhaust systems). In addition, the adhesive may be brittle, or it may not be strong enough to hold the components together at higher pressures.

In one embodiment, a covered conduit made according to a method described above may be pressurized to at least about 400, 1000, 2000, 3000, or 4000 p.s.i.a. with refrigerant. The refrigerant may be held within the conduit without any substantial leakage of refrigerant. Generally speaking, maintaining refrigerant or other gases without leakage tends to be more difficult than maintaining water or other liquids without leakage.

In an alternate embodiment the braid includes flattened strips of material, preferably flattened metal wires. Use of flattened strips of material instead of cylindrical wire is advantageous because: (a) less material is required to provide the same surface area coverage, (b) the flattened strips tend to be more aesthetically pleasing, (c) the resulting covered conduit tends to be more flexible because less braid material binds it, and (d) the flattened strips tend to provide a significantly enhanced frictional "grip" between the additional material 161 and the braid 123, the end conduit 103 (or end section 101) and the braid 123, and the convoluted conduit 100 and the braid 123. It is believed that this "grip" is enhanced because the flattened strips of material provide more surface area upon which the frictional hold may be applied, and thus the flattened braid strips are less likely to "slip out" from under the additional material 161 when the covered conduit is pressurized.

In an alternate embodiment, a covered conduit may be made by assembling a convoluted conduit 100 and an end conduit 103 such that an inner surface of the end section 101 substantially surrounds an outer surface of the end conduit 103. The braid 123, the convoluted conduit 100, the end conduit 103, and a portion of additional material 161 may be assembled such that (a) a portion of the braid 123 substantially surrounds an outer surface of the end section 101, (b) a portion of the braid 123 is between the end section 101 and the additional material 161, and (c) a portion of the braid 123 is between the convolution 131 proximate the end section 101 and the additional material 161. The assembled braid 123 and additional material 161 may be cold formed such that (a) at least a portion of the additional material 161 is bent onto a portion of the braid 123, (b) a portion of the braid 123 is held by friction between an outer surface of the end section 101 and at least a portion of the additional material 161, (c) a portion of the braid 123 is held by friction between an outer surface of the convolution 131 proximate the end section 101 and at least a portion of the additional material 161, and (d) the convolutions of the convoluted conduit 100 are not substantially deformed.

Preferably the covered conduits described herein are substantially flexible, especially covered conduits adapted to contain fluids at higher pressures.

Preferably a covered conduit made as described herein may be included in a system with a pump or compressor connected to the covered conduit. Preferably the covered conduit is connected such that the pump or compressor vibrates during use and such that the vibrations are maximized in a first direction, and wherein the conduit is longitudinally connected in a second direction which is substantially perpendicular to the first direction. The conduit may have a first end and a second end, the first end being closest to the pump or compressor and the second end being distant from the pump or compressor, and wherein the second end is anchored to prevent movement.

Alternately, the covered conduit described herein may be part of a vibration absorption system or a vehicle exhaust system.

Experiment #6—Covered Conduits Made Without Heat Processes

Tests were conducted on covered conduits made as described above (i.e., without heat) and shown in FIGS. 12–13 except the conduits were not swaged. Cold forming was performed by magneforming. The conduit materials were identical to the conduit materials described in Experiment #2 above, except that: (1) the braid wire was changed from 0.010 inch diameter round wire to 0.028 inch diameter round wire that was subsequently flattened, 2) there was less overall wire because the braid in Experiment #2 was type "48-5" (i.e., 48 strands of wire with five wires per strand) and the new braid was type "36-2" (i.e., 36 stands of wire with two wires per strand), and (3) the new braid wire was made of 304 stainless steel. The new braid was made by flattening 304 stainless steel 0.028 inch diameter annealed wire. This wire by flattened by running it through a wire flatting mill to produce a wire that measured 0.008 inch thick×0.078 inch wide.

Figure 17:
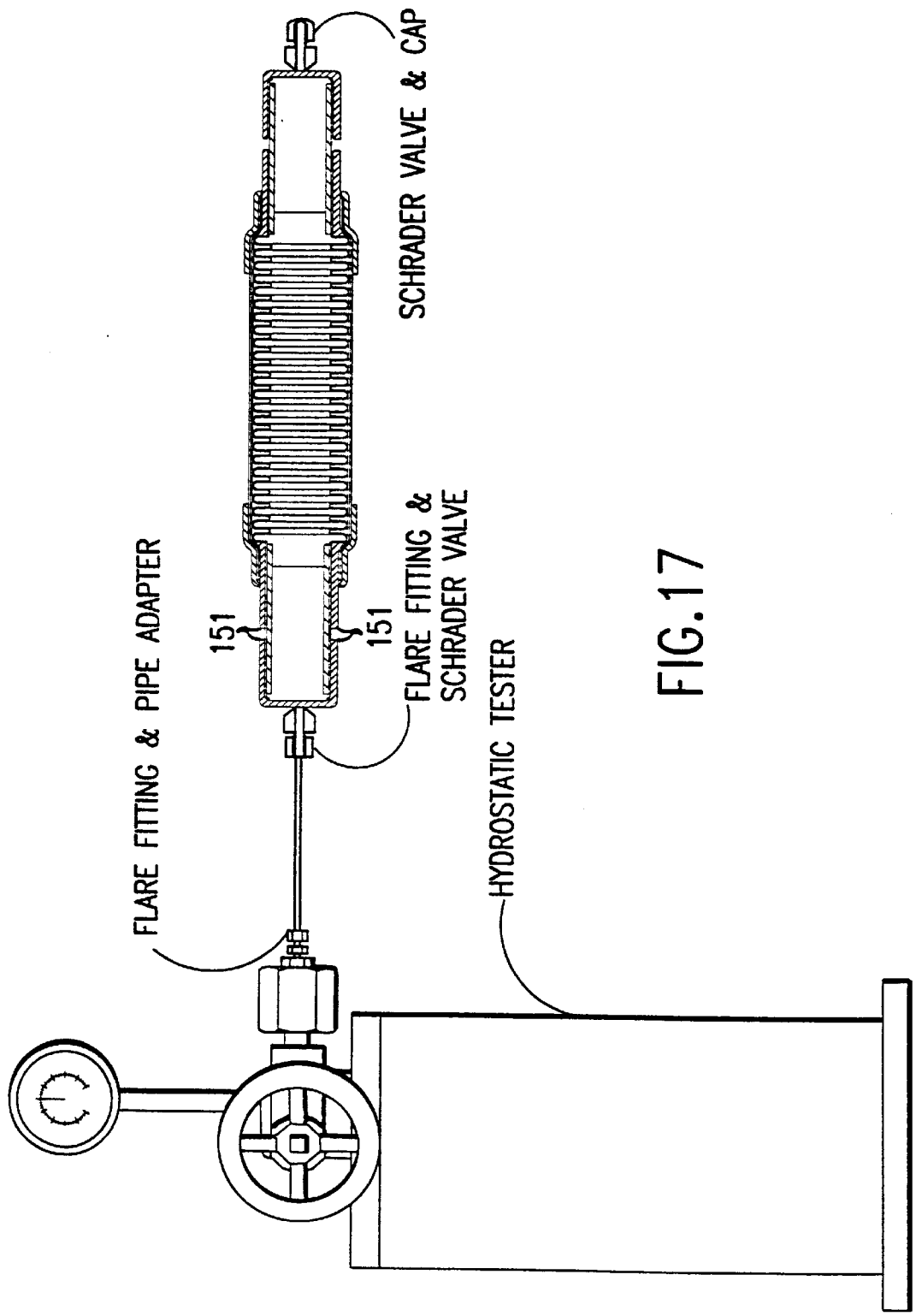
FIG. 17 depicts a covered conduit connected to a test apparatus.

The flattened wire cosmetically covered approximately 2.8 times more of the convoluted conduit per strand than did the round (cylindrical) wire. A benefit of using flattened wire was that it produced a full rounded edge which tended to reduce sharp edges. Moreover, the flattened wire tended to have a cosmetically pleasing bright finish. Finally, running the wire through a wire flattening mill tends to cold form the wire such that, in some circumstances, tensile strength of the wire is increased. The covered conduit units were hydraulically pressure tested using the device shown in FIG. 17, with the test fitting being inserted into the end section and being brazed at points 151. Results for covered conduit made using such wire are outlined in the table below.

| Unit Number | P.S.I. Failure Point | Description |
| --- | --- | --- |
| #1 | 5000 | no failure |
| #2 | 4700 | failure at test connection |
| #3 | 4700 | failure at test connection |
| #4 | 4600 | failure at test connections |
| #5 | 4800 | failure at test connection |
| #6 | 4700 | failure at test connection |

As shown above, units 1–6 did not exhibit any failures except at the test connection (which is not part of the covered conduit), thus indicating that the units held exceptionally well even at high pressures. It is believed that the improved pressure test results were caused by not using heat forming processes or adhesives to make the covered conduit, and as a result of using the flattened metal braid material.

Although not specifically illustrated in the drawings, it is understood that other additional and necessary materials, apparatus, and structural components will be provided, and that these and all of the components described above are arranged and supported in an appropriate fashion to form a complete and operative conduit, process, or system.

It is also understood that variations may be made in the present invention without departing from the spirit and scope of the invention. Of course, other variations can be made by those skilled in the art without departing from the invention as defined by the appended claims.

I claim:

1. A method of covering a convoluted conduit with a braid, the convoluted conduit having convolutions, a substantially unconvoluted end section, and a convolution proximate the end section, the method comprising:

assembling the convoluted conduit and an end conduit such that an inner surface of the end conduit substantially surrounds an outer surface of the end section of the convoluted conduit;

assembling the braid, the convoluted conduit, the end conduit, and a portion of additional material such that (a) a portion of the braid substantially surrounds an outer surface of the end conduit, (b) a portion of the braid is between the end conduit and the additional material, and (c) a portion of the braid is between the convolution proximate the end section and the additional material; and cold forming the assembled braid and additional material such that (a) at least a portion of the additional material is bent onto a portion of the braid, (b) a portion of the braid is held by friction between an outer surface of the end conduit and at least a portion of the additional material, (c) a portion of the braid is held by friction between an outer surface of the convolution proximate the end section and at least a portion of the additional material, and (d) the convolutions of the convoluted conduit are not substantially deformed.

2. The method of claim 1 wherein the length of the substantially unconvoluted end section is at least as great as the smallest inner diameter of the convoluted conduit.

3. The method of claim 1 wherein the end conduit has a wall thickness which is at least twice the convoluted conduit wall thickness.

4. The method of claim 1, further comprising forming an edge of the end conduit such that this edge flares outwardly from a center of the end conduit.

5. The method of claim 1, further comprising forming an edge of the end section of the convoluted conduit such that this edge flares outwardly from a center of the end section.

6. The method of claim 1, further comprising forming an edge of the end conduit such that this edge flares inwardly towards a center of the end conduit.

7. The method of claim 1, further comprising forming an edge of the end section of the convoluted conduit such that this edge flares inwardly towards a center of the end section.

8. The method of claim 1, further comprising cold forming the assembled braid and additional material such that the braid is bent against both the outer surface of the convolution proximate the end section and the outer surface of the end conduit, and at least a portion of the additional material is bent such that it lies on top of the bent portions of braid.

9. The method of claim 1 wherein the cold forming of the additional material thickens the additional material.

10. The method of claim 1 wherein the cold forming is by magneforming.

11. The method of claim 1 wherein the braid is cold formed such that the braid is at least partially embedded into the end conduit.

12. The method of claim 1 wherein the convoluted conduit and the braid comprise metal, and wherein neither the braid nor any portion of the convoluted conduit is heated when making the covered conduit.

13. The method of claim 1 wherein the convoluted conduit, the end conduit, the additional material, and the braid comprise metal, and wherein the convoluted conduit, the end conduit, the additional material, and the braid are not heat processed when making the covered conduit.

14. The method of claim 1, wherein a portion of the end conduit comprises a raised ridge, and wherein the cold forming bends the braid onto the raised ridge.

15. The method of claim 1 wherein the braid is bent so that it substantially conforms to the shape of an interface region between the end conduit and the convolution proximate the end section.

16. The method of claim 1 wherein the cold forming mechanically couples the assembled braid and additional material such that the convoluted conduit can contain a pressure of at least about 400 p.s.i.a. (about 27.5 bar) at 60° C.

17. The method of claim 1, wherein the braid comprises flattened strips of metal.

18. The method of claim 1 wherein an outer diameter of the convolution proximate the end section is greater than an outer diameter of the end section.

19. The method of claim 1, further comprising swaging the end conduit.

20. The method of claim 1, further comprising swaging the end section of the convoluted conduit.

21. The method of claim 1, further comprising cold-forming the assembled end conduit and end section together prior to assembling the braid, the convoluted conduit, the end conduit, and the portion of additional material.

22. The method of claim 1, further comprising magneforming the assembled end conduit and end section together prior to assembling the braid, the convoluted conduit, the end conduit, and the portion of additional material.

23. The method of claim 1, further comprising cold-forming the assembled end conduit and end section together and then swaging the end conduit and the end section prior to assembling the braid, the convoluted conduit, the end conduit, and the portion of additional material.

24. The method of claim 1, further comprising hot processing a fitting to the end section without substantially heating the braid or the convolutions.

25. The method of claim 1 wherein the convoluted conduit is made by internally pressurizing a conduit so that portions of the walls of the conduit are bent to form raised convolutions.

26. The method of claim 1 wherein the cold-forming mechanically couples the assembled braid, convoluted conduit, end conduit, and additional material such that the covered conduit is substantially leak-proof without use of an adhesive.

27. The method of claim 1 wherein the cold-forming mechanically couples the assembled braid, convoluted conduit, end conduit, and additional material such that the covered conduit is substantially leak-proof without use of welding.

28. The method of claim 1 wherein the braid comprises flattened strips of material.

29. The method of claim 1 wherein the braid comprises flattened metal wires.

30. A method of using a conduit made according to the method of claim 1, comprising pressurizing the conduit to at least about 400 p.s.i.a. with refrigerant and holding the refrigerant within the conduit without any substantial leakage of refrigerant.

31. A conduit covered by a braid which is made according to the method of claim 1.

32. A convoluted conduit covered with a braid, comprising:
- a section of convoluted conduit comprising convolutions, a substantially unconvoluted end section, and a convolution proximate the end section;
- an end conduit substantially surrounding at least a portion of an outer surface of the end section;
- a braid covering at least a portion of the convoluted conduit and at least a portion of the end conduit;
- additional material covering a portion of the braid; and
- wherein at least a portion of additional material is formed onto a portion of the braid in a cold formed connection such that (a) a portion of the braid is held by friction between an outer surface of the end conduit and at least a portion of the additional material, (b) a portion of the braid is held by friction between an outer surface of a convolution proximate the end section and at least a portion of the additional material, and (c) the convolutions of the convoluted conduit are not substantially deformed.

33. The conduit of claim 32 wherein the convoluted conduit is substantially flexible.

34. The conduit of claim 32 wherein the length of the substantially unconvoluted end section is at least as great as the smallest inner diameter of the convoluted conduit.

35. The conduit of claim 32 wherein the end conduit has a wall thickness which is at least twice the convoluted conduit wall thickness.

36. The conduit of claim 32 wherein the end conduit comprises an edge that is flared outwardly from a center of the end conduit.

37. The conduit of claim 32 wherein the end section comprises an edge that is flared outwardly from a center of the end section.

38. The conduit of claim 32 wherein the end conduit comprises an edge that is flared inwardly towards a center of the end conduit.

39. The conduit of claim 32 wherein the end section comprises an edge that is flared inwardly towards a center of the end section.

40. The conduit of claim 32 wherein the assembled braid and additional material have a cold formed connection such that the braid is bent against both the outer surface of the convolution proximate the end section and the outer surface of the end conduit, and at least a portion of the additional material is bent such that it lies on top of the bent portions of braid.

41. The conduit of claim 32 wherein the additional material is thicker than it was before being cold formed.

42. The conduit of claim 32 wherein the cold formed connection is by magneforming.

43. The conduit of claim 32 wherein the braid is at least partially embedded into the end conduit.

44. The conduit of claim 32 wherein the convoluted conduit and the braid comprise metal, and wherein the braid and the convoluted conduit have not been annealed.

45. The conduit of claim 32 wherein the convoluted conduit, the end conduit, the additional material, and the braid comprise metal, and wherein the convoluted conduit, the end conduit, the additional material, and the braid have not been hot processed.

46. The conduit of claim 32 wherein a portion of the end conduit comprises a raised ridge, and wherein the braid is bent onto the raised ridge.

47. The conduit of claim 32 wherein the braid is bent so that it substantially conforms to the shape of an interface region between the end conduit and the convolution proximate the end section.

48. The conduit of claim 32 wherein the convoluted conduit is adapted to contain a pressure of at least about 400 p.s.i.a. (about 27.5 bar) at 60° C.

49. The conduit of claim 32 wherein the braid comprises flattened strips of metal.

50. The conduit of claim 32 wherein the braid comprises flattened metal wires.

51. The conduit of claim 32 wherein an outer diameter of the convolution proximate the end section is greater than an outer diameter of the end section.

52. The conduit of claim 32 wherein the end conduit is swaged.

53. The conduit of claim 32 wherein the end section of the convoluted conduit are swaged.

54. The conduit of claim 32 wherein the assembled end conduit and the end section are secured together by a cold formed connection.

55. The conduit of claim 32 wherein the assembled end conduit and the end section are magneformed together.

56. The conduit of claim 32 wherein the assembled end conduit and the end section are cold formed together and the end conduit and the end section are swaged.

57. The conduit of claim 32 further comprising a fitting hot processed to the end section without substantially heating the braid or the convolutions.

58. The conduit of claim 32 wherein the convoluted conduit is made by internally pressurizing a conduit so that selected portions of the walls of the conduit are bent to form raised convolutions.

59. The conduit of claim 32 wherein the assembled braid, convoluted conduit, end conduit, and additional material are mechanically coupled together such that the covered conduit is substantially leak-proof without use of an adhesive.

60. The conduit of claim 32 wherein the assembled braid, convoluted conduit, end conduit, and additional material are mechanically coupled together such that the covered conduit is substantially leak-proof without use of a hot process.

61. The conduit of claim 32 wherein a cross section of the braid comprises at least two bends which strengthen the frictional hold on the braid.

62. The conduit of claim 32 wherein the conduit comprises an outer diameter greater than an outer diameter of the end section, and wherein the braid lies against both the outer diameter of the conduit and the outer diameter of the end section.

63. A system comprising a pump or compressor connected to the conduit of claim 32.

64. The system of claim 63 wherein the pump or compressor vibrates during use such that the vibrations are maximized in a first direction, and wherein the conduit is longitudinally connected in a second direction which is substantially perpendicular to the first direction.

65. The system of claim 63 wherein the conduit has a first end and a second end, the first end being closest to the pump or compressor and the second end being distant from the pump or compressor, and wherein the second end is anchored to prevent movement.

66. A vibration absorber comprising the conduit of claim 32.

67. A vehicle exhaust system comprising the conduit of claim 32.

* * * * *

EX PARTE REEXAMINATION CERTIFICATE (9592nd)

United States Patent
Reed

(10) Number: US 5,803,128 C1
(45) Certificate Issued: Apr. 11, 2013

(54) BRAIDED CONDUIT AND METHOD OF MAKING A BRAIDED CONDUIT

(75) Inventor: Edward A. Reed, Waco, TX (US)

(73) Assignee: Packless Metal Hose, Inc., Waco, TX (US)

Reexamination Request:
No. 90/012,573, Sep. 14, 2012

Reexamination Certificate for:
Patent No.: 5,803,128
Issued: Sep. 8, 1998
Appl. No.: 08/533,431
Filed: Sep. 25, 1995

Related U.S. Application Data

(63) Continuation-in-part of application No. 08/236,217, filed on Apr. 28, 1994, now Pat. No. 5,813,438.

(51) Int. Cl.
*F16L 33/26* (2006.01)

(52) U.S. Cl.
USPC .......... 138/123; 138/118; 138/109; 138/121; 72/367.1; 72/54

(58) Field of Classification Search ................. None
See application file for complete search history.

(56) References Cited

To view the complete listing of prior art documents cited during the proceeding for Reexamination Control Number 90/012,573, please refer to the USPTO's public Patent Application Information Retrieval (PAIR) system under the Display References tab.

*Primary Examiner* — Joseph Kaufman

(57) ABSTRACT

Convoluted conduit covered with braid made by cold forming the braid to an end conduit or an end section of the convoluted conduit. Cold forming can involve magneforming. Resulting conduit need not be brazed, welded, or annealed, thereby facilitating construction of convoluted conduits with higher working pressures and/or less braid material.

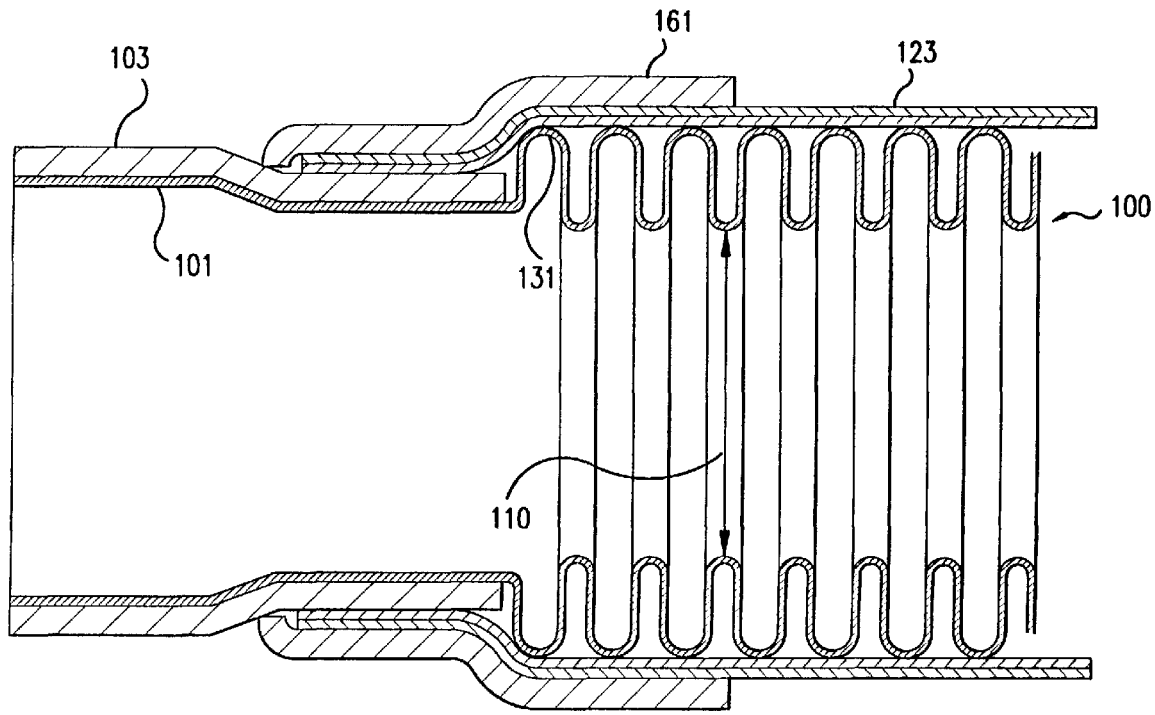

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 3, 4, 11-14, 17, 18, 28, 29, 31-33, 35, 36, 43-46, 49-51, 54 and 59-61 is confirmed.

Claims 2, 5-10, 15, 16, 19-27, 30, 34, 37-42, 47, 48, 52, 53, 55-58 and 62-67 were not reexamined.

* * * * *